US008990455B1

(12) United States Patent  (10) Patent No.: US 8,990,455 B1
Owen  (45) Date of Patent: Mar. 24, 2015

(54) OFFLOADING TASKS FROM A CENTRAL PROCESSING UNIT TO PERIPHERAL FUNCTION ENGINES

(71) Applicant: Cypress Semiconductor Corporation, San Jose, CA (US)

(72) Inventor: Stuart Owen, Seattle, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/836,566

(22) Filed: Mar. 15, 2013

Related U.S. Application Data

(60) Provisional application No. 61/662,817, filed on Jun. 21, 2012.

(51) Int. Cl.
*G06F 13/28* (2006.01)
*G06F 13/10* (2006.01)
*G06F 11/34* (2006.01)
*G06F 13/00* (2006.01)
*G06F 15/78* (2006.01)

(52) U.S. Cl.
CPC ............ *G06F 13/10* (2013.01); *G06F 11/3404* (2013.01); *G06F 13/00* (2013.01); *G06F 15/7867* (2013.01)
USPC .................................. 710/36; 710/24; 710/22

(58) Field of Classification Search
CPC G06F 11/34304; G06F 15/7867; G06F 13/00
USPC .................................................... 710/36, 24
See application file for complete search history.

(56) References Cited

U.S. PATENT DOCUMENTS

| 7,737,724 | B2 | 6/2010 | Snyder et al. |
| 8,112,551 | B2 | 2/2012 | Sullam |
| 8,135,884 | B1 | 3/2012 | Sullam et al. |
| 8,145,812 | B1 | 3/2012 | Kavaiya et al. |
| 8,234,425 | B1 | 7/2012 | Milner |
| 8,487,655 | B1 * | 7/2013 | Kutz et al. .................... 326/86 |
| 2008/0258759 | A1 | 10/2008 | Snyder et al. |
| 2008/0263319 | A1 | 10/2008 | Snyder et al. |
| 2008/0263334 | A1 | 10/2008 | Synder et al. |
| 2008/0288755 | A1 | 11/2008 | Synder et al. |
| 2008/0294806 | A1 | 11/2008 | Swindle et al. |
| 2011/0304354 | A1 | 12/2011 | Snyder et al. |

OTHER PUBLICATIONS

Cypress Semiconductor; "Cypress Unveils New PSoC® 3 Family with Integrated Low-Power Programmable Digital Logic" http://www.cypress.com/?rID=42737, May 10, 2011, 2 pages.
Cypress Perform, "PSoC® 5: CY8C53 Family Datasheet", http://html.alldatasheet.com/html-pdf/409505/Cypress/CY8C53/11356/38/CY8C53.html, retrieved Sep. 2012, 2 pages.
Cypress Perform, "PSoC 3 / PSoC 5 101: Architecture Overview" www.engr.sjsu.edu/.../CUA101__%20Overview_Design_Flow.ppt, retrieved Sep. 2012, 58 pages.
icFull.com, "Distributed processing efficiency by increasing processor", http://tech.icfull.com/201012/Distributed-processing-efficiency-by-increasing-processor_6506.html, Dec. 15, 2010, 3 pages.
Search Report for "Offloading Tasks From a Central Processing Unit to Peripheral Function Engines", Sep. 2012, 7 pages.

* cited by examiner

*Primary Examiner* — Ernest Unelus

(57) ABSTRACT

An apparatus includes an array of universal digital blocks (UDBs) and a central processing unit (CPU) coupled to the array of UDBs via a bus. The UDBs may be coupled together to perform tasks, operations or functions that may be offloaded from the CPU to the array of UDBs.

17 Claims, 20 Drawing Sheets

US 8,990,455 B1

OFFLOADING TASKS FROM A CENTRAL PROCESSING UNIT TO PERIPHERAL FUNCTION ENGINES

This application claims priority to U.S. Provisional Application No. 61/662,817, filed Jun. 21, 2012.

TECHNICAL FIELD

The present disclosure relates generally to microcontrollers and particularly to components of a microcontroller.

BACKGROUND

A system on chip (SoC) may include a central processing unit (CPU) and multiple other components for performing various functions, operations, calculations or actions. Often complex calculations are performed by the CPU of the SoC because the other components of the SoC are not complex enough or do not have enough processing power to perform the complex calculations. For example, calculation of a square root value is often performed by the CPU. In another example, performing automatic gain control is often performed by the CPU. In a further example, calculating the root mean square is often performed by the CPU. As the requirements of users and applications executed by the SoC become more complex, the burden on the CPU increases because the CPU performs most, if not all of the complex calculations or operations. This may cause delays when the CPU performs multiple operations and may also cause the CPU to user more processing resources which may cause the CPU to user more power.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Figure 1:
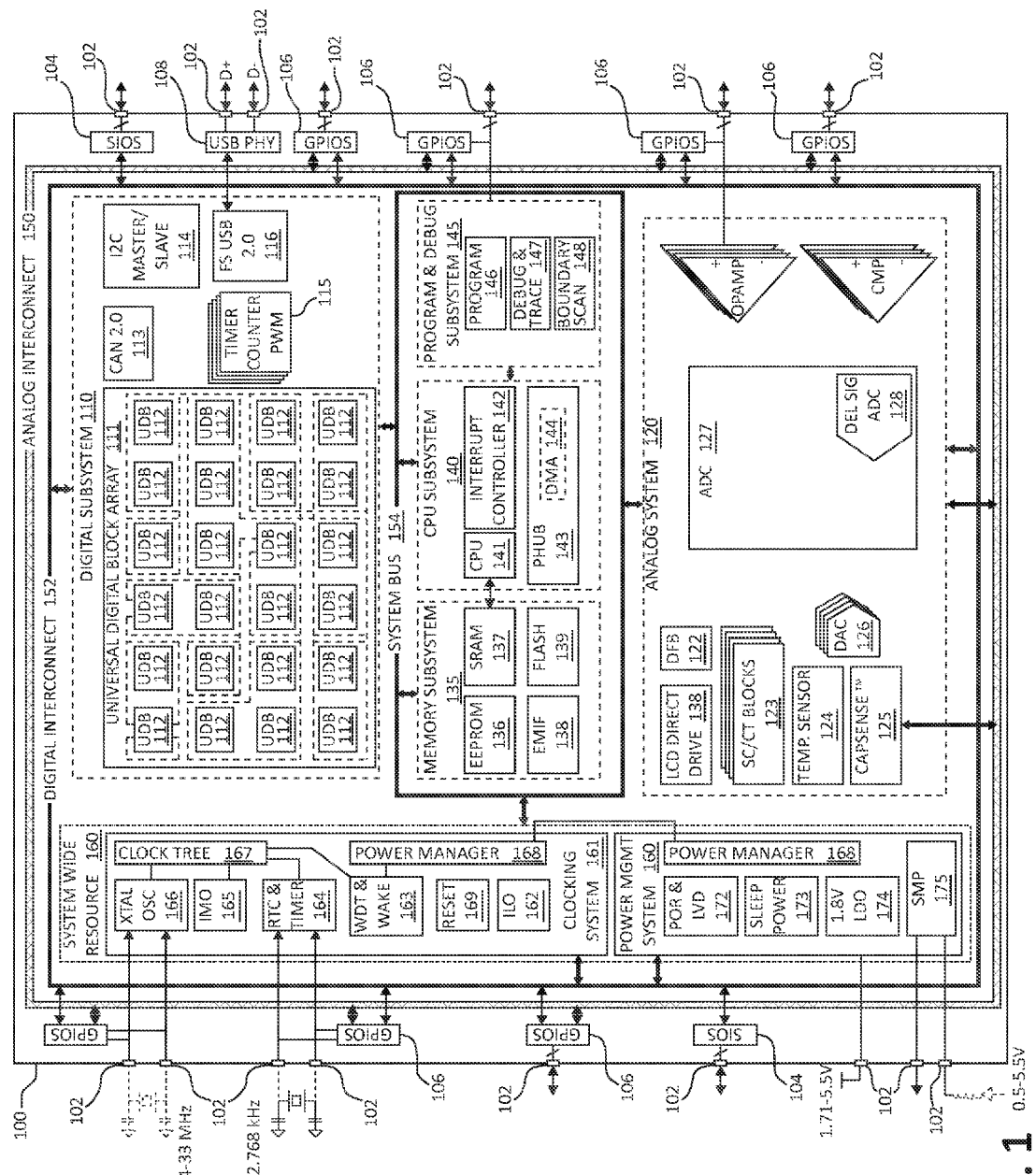
FIG. 1 illustrates a core architecture of a Programmable System-on-Chip (PSoC™) according to an embodiment.

In one embodiment, certain processing tasks are performed outside of a central processing unit (CPU) using a network of distributed universal digital blocks (UDBs) connected via DMA and programmable logic. Multiple UDBs may be coupled together to perform task, calculations, operations, and functions that a single UDB may be unable to perform. By connecting the memory registers, datapaths, and processing logic of UDBs, the UDBs may be combined to perform complex task, allowing the CPU to offload these tasks to the UDBs. The CPU may use fewer processing resources, use processing resources for a shorter amount of time, and may use less power when offloading tasks to UDBs. FIG. 1 illustrates an embodiment of a core architecture 100 of a Programmable System-on-Chip (PSoC®), such as that used in the PSoC® family of products offered by Cypress Semiconductor Corporation (San Jose, Calif.). In one embodiment, the core architecture includes a digital subsystem 110. The digital subsystem 110 includes a universal digital block array 111, comprising a plurality of universal digital blocks (UDBs) 112, a CAN 2.0 interface controller (CAN 2.0) 113, an I²C Master and Slave controller (I²C M/S) 114, a plurality of multifunction digital blocks (MDBs) 115 and a full-speed USB 2.0 interface controller (FSUSB 2.0) 116. MDBs 115 may be configured to perform common digital functions such as timers, counters and pulse-width modulators (PWMs). The elements of digital system 110 may be coupled to digital interconnect 152 and/or to the system bus 154.

The core architecture may also include an analog subsystem 120. The analog subsystem may include an LCD direct drive block 121, a digital filter block (DFB) 122, a plurality of switched-capacitor/continuous time mixed-function analog (SC/CT) blocks 123, a temperature sensor block 124, a capacitive sensing (CapSense™) block 125, a plurality of digital-to-analog converters 126, an analog-to-digital converter (ADC) 127 including a delta-sigma ADC 128, a plurality of operational amplifiers (opamps) 129 and a plurality of comparators (CMP) 130. The elements of analog subsystem 120 may be coupled to analog interconnect 150 and/or the system bus 154. CapSense™ block 125 may be coupled to the analog interconnect 150 separate from other elements of analog subsystem 120.

The core architecture 100 may also include memory subsystem 135, CPU subsystem 140 and programming and debug subsystem 145. Memory subsystem 135 may include an EEPROM block 136, synchronous random access memory (SRAM) 137, an external memory interface (EMIF) block 138, and flash memory (FLASH) 139. CPU subsystem 140 may include a CPU 141, an interrupt controller 142 and a bus bridge controller (DMA/PHUB) 143, which may include a direct memory access (DMA) controller 144. The program and debug subsystem 145 may include a programming block 146, and debug and trace block 147 and a boundary scan block 148. The program and debug subsystem may be coupled to the CPU subsystem. The CPU subsystem and the memory system may be coupled to system bus 154. The memory subsystem 135 may be coupled to the CPU subsystem 140 through the system bus 154. In one embodiment, FLASH 139 may be coupled to the CPU 141 directly.

The core architecture 100 may also include system-wide resources 160. System-wide resources may include a clocking subsystem 161 and power management subsystem 171. Clocking subsystem 161 may include an internal low-speed oscillator block (ILO) 162, a watch-dog timer (WDT) and wake-up controller block 163, a real-time clock (RTC)/timer block 164, an internal main oscillator block (IMO) 165, a crystal oscillator block (Xtal Osc) 166, a clock tree 167, power manager 168 and reset block 169. In one embodiment the RTC/timer block 164 and the ILO 162 may be coupled to the WDT and wake-up controller block 163. In another embodiment, clock tree 167 may be coupled to xtal osc block 166 and IMO 165. Power management system 171 may include power-on-reset (POR) and low-voltage-dropout (LVD) block 172, a sleep power block 173, a 1.8V internal regulator (LDO) 174, a switch-mode pump (SMP) 175 and power manager 178. Power manager 178 may be coupled to power manager 168 of the clocking subsystem 161. In one embodiment, system-wide resources 160 may be coupled to system bus 154.

The core architecture 100 may also include a plurality of pins 102. Pins 102 may be used to connect elements of core architecture 100 to off-chip elements or route signals into, out of or to different pins of the device. Core architecture 100 may also include a plurality of special input/outputs (SIOs) 104 and general purpose input/outputs (GPIOs) 106. SIOs 104 may be coupled to digital interconnect 152. GPIOs 106 may be coupled to analog interconnect 150, digital interconnect 152, RTC/timer block 164, and/or Xtal Osc block 166. Core architecture may also include USB input/outputs (USB PHY) 108, which may be coupled to FSUSB 2.0 116.

Figure 2:
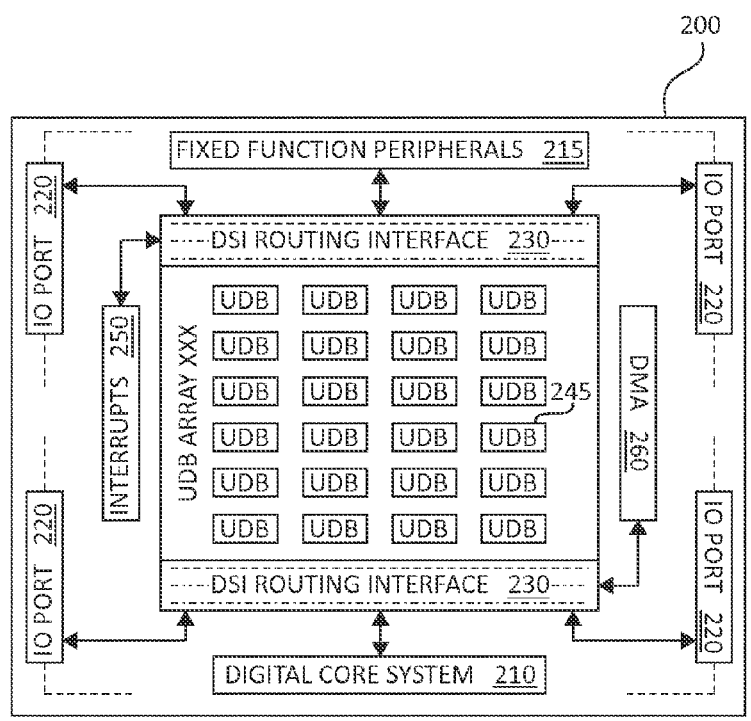
FIG. 2 illustrates a digital subsystem of the core architecture according to an embodiment.
Figure 9:
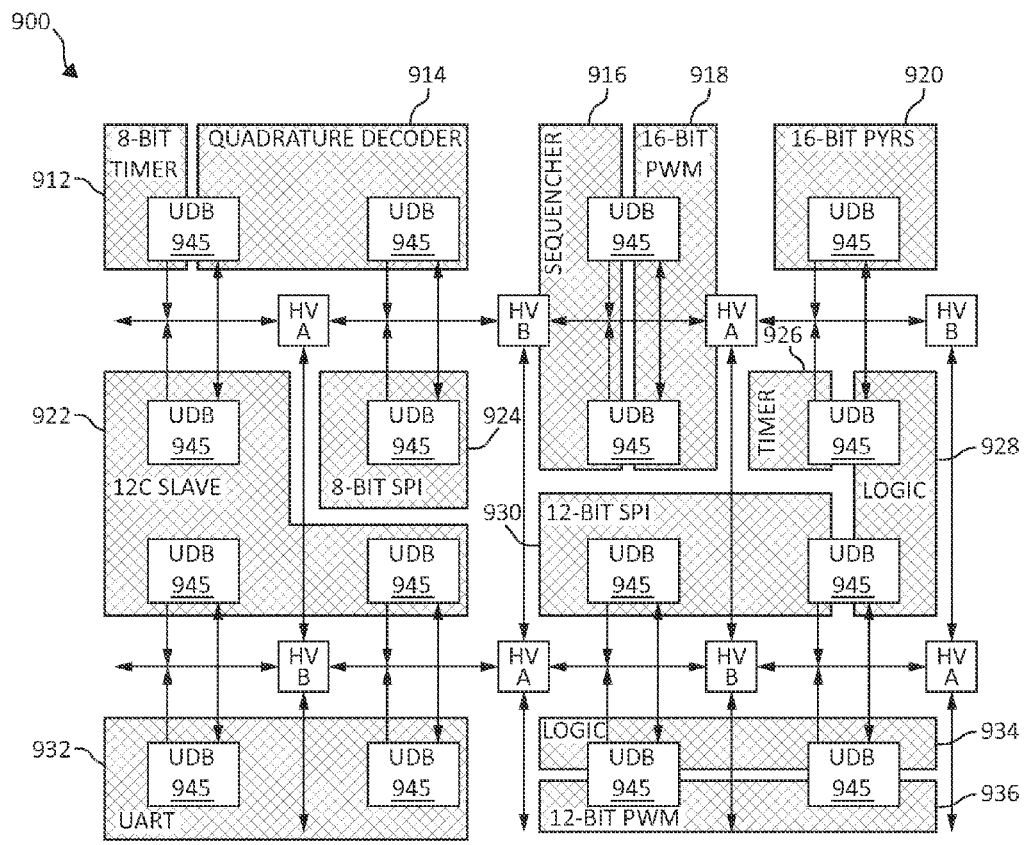
FIG. 9 illustrates a UDB array with digital functions mapped onto the array according to an embodiment.

FIG. 2 illustrates one embodiment of a digital subsystem portion 200 of digital subsystem 110 (FIG. 1). The digital subsystem portion 200 is configurable to perform digital signal processing functions including but not limited to pulse-width modulators, timers, counters, I2C communication, SPI communication, UART communication, cyclical redundancy checks, pseudo-random sequence generators, digital LCD drivers, state machines, digital multiplexors and sequencers, decimators, shift registers as well as combinatorial logic functions. Mixed-signal operations enabled by the digital subsystem may include but not be limited to analog-to-digital converters, digital-to-analog converters, mixers, modulators and demodulators when coupled to the elements of the analog subsystem (e.g., 120, FIG. 1). The digital system includes highly configurable universal digital blocks (e.g., UDBs, 112, FIG. 1), which may be configured to perform various digital functions alone or in combination with other UDBs. Further, UDBs may be partitioned and their resources shared to optimized mapping of digital functions onto an array of UDBs. An example of this is shown in FIG. 9 and discussed later in this specification.

Digital subsystem portion 200 may include a plurality of digital core system elements 210, such as clock dividers and memory, fixed function peripherals 215 and IO ports 220 coupled to a digital routing fabric (e.g., digital system interconnect—DSI) 230. DSI 230 may be coupled to UDB array 240, which may include a plurality of UDBs (245). UDBs 245, fixed function peripherals 215, IO ports 220, interrupts 250, DMA 260 and digital core system elements 210 may be coupled to the DSI 230 to implement full-featured device connectivity. DSI 230 may allow any digital function to be routed to any pin 102 (FIG. 1) or other feature to be routed when coupled through UDB array 240. In one embodiment, UDBs 112 may be a collection of uncommitted logic (PLD) and structural logic optimized to create common embedded peripherals and customized functionality that are application or design specific. In one embodiment UDBs 112 may be arranged in a matrix with a homogenous structure to allow flexible mapping of digital functions onto the array. The array may support extensive and flexible routing interconnects between UDBs 112 and DSI 230.

Figure 3:
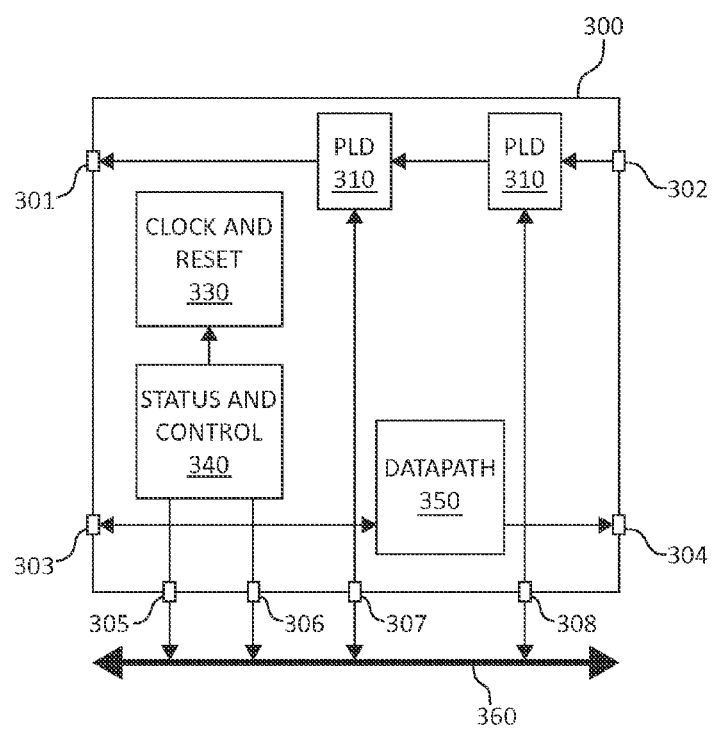
FIG. 3 illustrates a universal digital block (UDB) of the digital subsystem according to an embodiment.

FIG. 3 illustrates one embodiment of a UDB 300, for example as found in FIGS. 1 (112) and 2 (245). UDBs may be configured to perform digital functions alone or in combination with other UDBs by using a highly configurable interconnect and chaining structure which allows UDBs to share unused resources with other groups of UDBs. In one embodiment, a UDB may also be referred to as a peripheral function engine. In another embodiment, a plurality of UDBs coupled together (e.g., an array of UDBs) may be referred to as an array of peripheral function engines.

UDB 300 (e.g., peripheral function engine) may include a first programmable logic device (PLD) 310 coupled to PLD chaining IO 301, routing channel 360 through routing IO 307 and a second PLD 320. Second PLD 320 may be coupled to PLD chaining IO 302, first PLD 310 and routing channel 360 through routing IO 308. UDB 300 may also include a clock and reset control block 330, which may be coupled to a status and control block 340. Status and control block 340 may be coupled to routing channel 360 through routing IOs 305 and 306. UDB 300 may also include a datapath module 350 which is coupled through to datapath modules of other UDBs through datapath chaining IOs 303 and 304. PLDs 310 and 320 may take inputs from the routing channel 360 and form registered or combinational sum-of-products logic and may be used to implement state machines, state bits and combinational logic equations. In some embodiments, PLD configurations may be automatically generated from graphical primitives, where functions are mapped to the PLD the PLD is configured based on the settings of those functions. In some embodiments, datapath module 350 may be a datapath containing structured logic to implement a dynamically configurable arithmetic logic unit (ALU) and a variety of compare configurations and conditions. The datapath module 350 may also contain input/output FIFOs to serve as the parallel data interface between the CPU system 140 (FIG. 1) and the UDB 300. The status and control block 330 may be used by the UDB 300 to interact with and synchronize to the CPU (e.g., 141, FIG. 1). In one embodiment, DMA may be used to couple the FIFOs and the status and control block 340 to other UDBs or the CPU.

Figure 4:
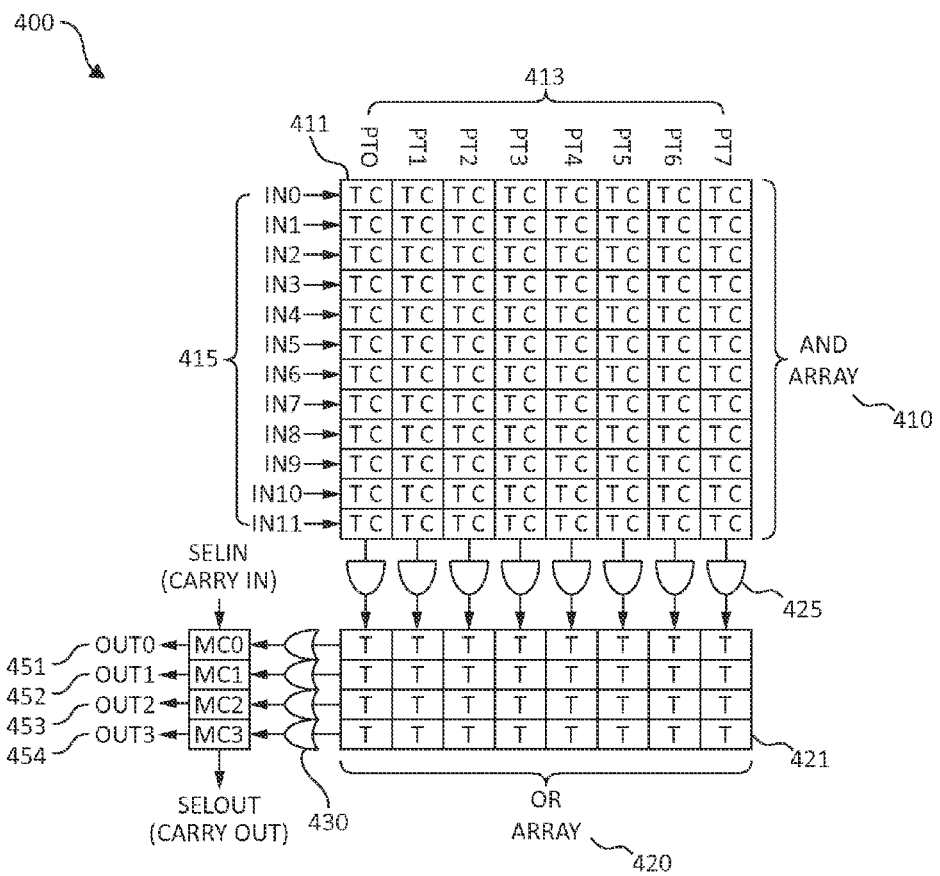
FIG. 4 illustrates a programmable logic device of a UDB according to an embodiment.

FIG. 4 illustrates one embodiment of a PLD 400 as part of a UDB (e.g., 300, FIG. 3) and linked to other UDBs and PLDs (e.g., 310 and 320, FIG. 3). The PLD of a UDB (e.g., peripheral function engine) is configurable to provide generic logic such as an AND gate, an OR gate and a flip flop used for synthesizing Verilog written during development. PLD 400 may include an AND array 410 of inputs 415 and product terms 413. For each product term 411 the true (T) or complement (C) of each input 415 may be selected. In one embodiment, there may be eight product terms 413 and twelve inputs 415. In other embodiments there may be more or less than eight product terms 413 and twelve inputs 415. Product terms from the AND array 410 are ANDed through AND functions 425 to create an OR array 420 of product terms 421. The product terms 421 may be summed through OR functions 430 to create PLD outputs 451-454. The summed output of OR functions 425 may be between one and the maximum number of product terms wide. Eight product terms are shown as part of PLD 400. In one embodiment, the width of the OR gate may be constant across all outputs. In another embodiment, the width of the OR gate may be variable.

Figure 5:
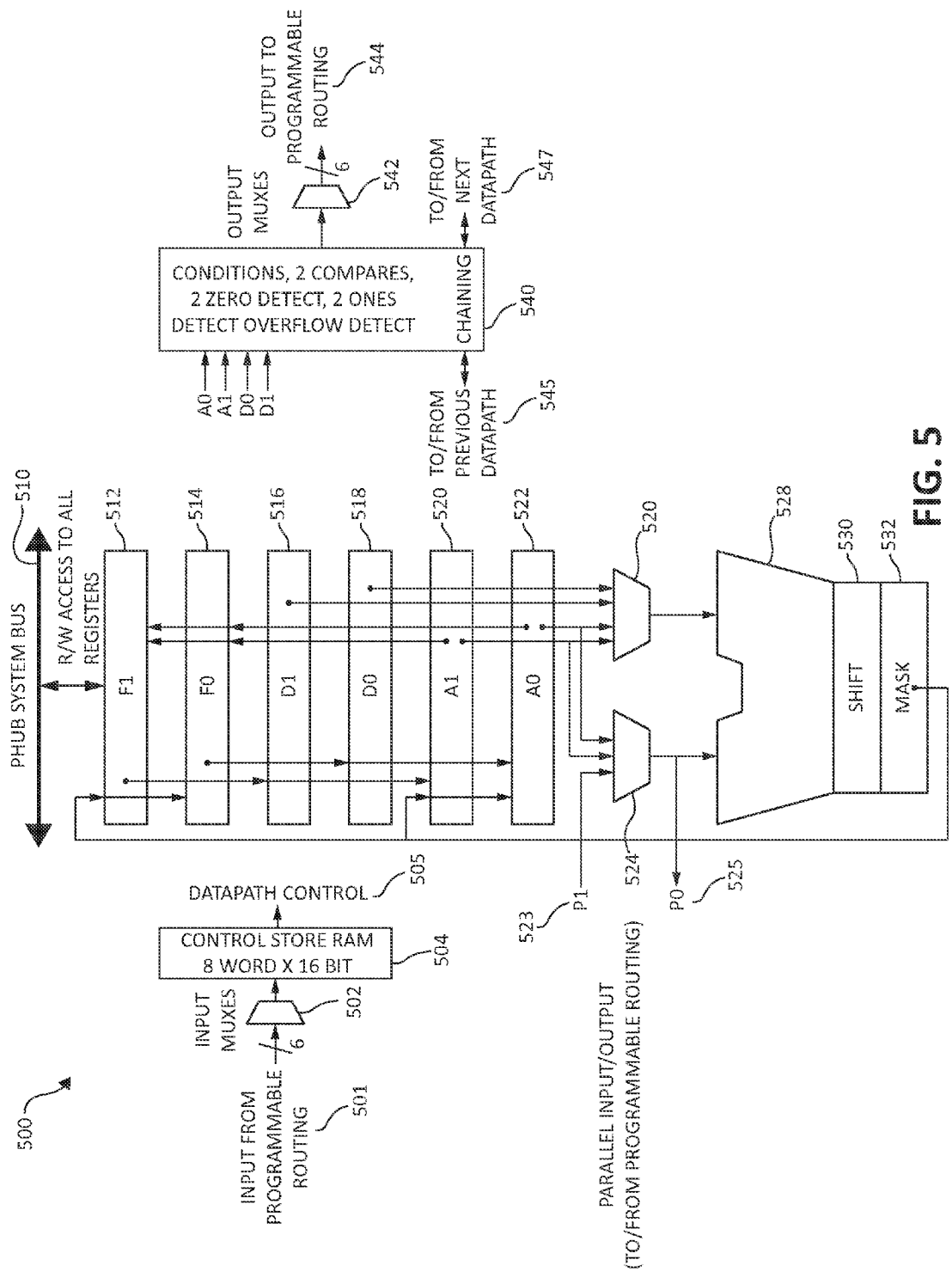
FIG. 5 illustrates a datapath module of a UDB according to an embodiment.

FIG. 5 illustrates one embodiment of a datapath module 500 implemented in a UDB (e.g., 300, FIG. 3) as well as the chaining of multiple datapaths from multiple UDBs (e.g., an array of peripheral function engines). The datapath includes an arithmetic logic unit (e.g. ALU 528) as well as data registers which may be configured to implement a flag when the counter is finished, or in another embodiment when a status output for when a timer reaches a threshold. The datapath allows chaining and MUXing of UDBs to created larger digital functions. For example, two UDBs may be chained together to provide higher-bit functionality. Datapath module 500 may include one or more inputs 501 from a programmable routing to one or more input multiplexors 502. Inputs 501 connect the datapath module 500 to the routing matrix and provide the configuration for the datapath operation to perform in each cycle and the serial data inputs. Inputs may be routed from other UDBs, other device peripheral, device IO pins or other system elements. The output of the input multiplexors 502 may be coupled to a control store RAM 504. In one embodiment, control store RAM 504 may be a memory array, wherein unique configurations may be stored. Control store RAM may then be coupled to datapath control 505. PHUB system bus 510 may provide read- and write-access to datapath registers F1 512, F0 514, D1 516, D0 518, A1 520, and A0 522. Datapath registers 512-522 may be combined or used individually and routed through MUXes 524 and 526. Parallel input PI 523 may also be routed from programmable routing through MUX 524. MUXes 524 and 526 may have outputs that are coupled to arithmetic logic unit (ALU) 528. Parallel output PO 525 may also be routed from the output of MUX 524 to programmable routing. ALU 528 may be coupled to shift function 530. Shift function 530 may be coupled to mask function 532. Outputs 544 to the programmable routing may be selected from the general conditions and the serial data outputs. Outputs 544 may be routed to other UDBs, device peripherals, interrupt controllers, the DMA, IO pins and other system elements. Datapaths may be chained through chaining block 540 with inputs from A0, A1, D0, D1 and data from previous datapath 545 to chaining block 540. Outputs 544 are routed to the programmable routing through a plurality of output MUXes 542 or to/from the next datapath 547.

Datapath module 500 may include six primary working registers 512-522, which may be accessed by the CPU (FIG. 1) or DMA (FIG. 1) during device operation. Primary working registers 512-522 may be categorized as accumulators (A0 522 and A1 520), data registers (D0 518 and D1 516) or FIFOs (F0 514 and F1 512). In one embodiment, accumulators may be sources and sinks for ALU 528 or sources for compares. Data registers may be sources for ALU 528 as well as for compares. FIFOs may be primary interfaces to system bus 154 (FIG. 1). FIFOs may also be data sources for the data registers and accumulators. FIFOs may also capture data from accumulators and from ALU 528. In one embodiment, each FIFO may be four bytes deep.

ALU 528 may be configured to perform a variety of general-purpose functions by writing to ALU control registers (not shown) or sending control signals to ALU 528. Digital functions may include Increment, Decrement, Add, Subtract, Logical AND, Logical OR, and Logical XOR. Digital functions may be reloaded into the ALU 528 and selected by writing to ALU control registers (not shown) by the CPU (e.g., 141, FIG. 1) or the DMA controller (e.g., 144, FIG. 1). Datapath module 500 may also be configured to perform functions independent of ALU 528 operation. Such functions may include Shift Left, Shift Right, Nibble Swap, and Bitwise OR Mask.

Datapath module 500 may be optimized to implement embedded functions such as timers, counters, integrators, PWMs, pseudo-random sequence generators (PRSs), cyclic redundancy checks (CRCs), shifters, dead band generators and other digital functions by writing to ALU control registers (not shown) with the CPU (e.g., 141, FIG. 1) or the DMA controller (e.g., 144, FIG. 1).

In one embodiment, datapath module 500 may be configured to chain conditions and signals with neighboring datapaths to create higher-precision arithmetic, shift, CRC or PRS functions.

In one embodiment, ALU 528 may be shared in applications that are over sampled or do not need high clock rates. Carry and shift out data from ALU 528 may be stored in data registers and may be selected as inputs in subsequent cycles. Such a configuration may provide support for functions that require greater bit lengths than are available in a single datapath.

In one embodiment, conditions may be created by datapath module 500 which may include two compare operands. The two compares of datapath module 500 may have bit masking options. Compare operands may include accumulators A0 522 and A1 520 and data registers D0 518 and D1 516 in a variety of configurations. Other conditions created by datapath module 500 may include zero detect, all ones detect and overflow. Conditions may be the primary outputs of datapath module 500. The outputs of datapath module 500 may be driven out to the UDB routing matrix. In one embodiment, conditional computation can use the built in chaining to neighboring UDBs to operate on wider data widths without the need to use routing resources.

In one embodiment, the most significant bit (MSB) of ALU 528 and shift function 530 may be programmatically specified to support variable-width CRC and PRS functions. In conjunction with masking function 532, the MSB of ALU 528 and shift function 530 may implement arbitrary-width timers, counters and shift blocks.

Datapath module 500 may include built-in support for single-cycle CRC computation and PRS generation of arbitrary width and arbitrary polynomial. CRC and PRS functions longer than eight bits may be implemented in conjunction with PLD logic, or built-in chaining may be used to extend the functions into neighboring UDBs.

FIFOs F0 514 and F1 512 may be four bytes deep and configured independently as an input buffer or an output buffer. In the case of an input buffer, system bus 154 (FIG. 1) may write to the FIFO and datapath module 500 may perform an internal read of the FIFO. In the case of an output buffer, datapath module 500 may perform an internal write to the FIFO and system bus 154 may read from the FIFO. FIFOs F0 514 and F1 512 may generate a status that is selectable as a datapath output and can be driven to routing. Once driven to routing, the status generated by F0 514 and F1 512 may interact with sequencers to move the device between states or to execute ordered functions, interact with interrupts to generate tasks in software or interact with the DMA to store the status to a memory location or registers without consuming CPU overhead.

Figure 6:
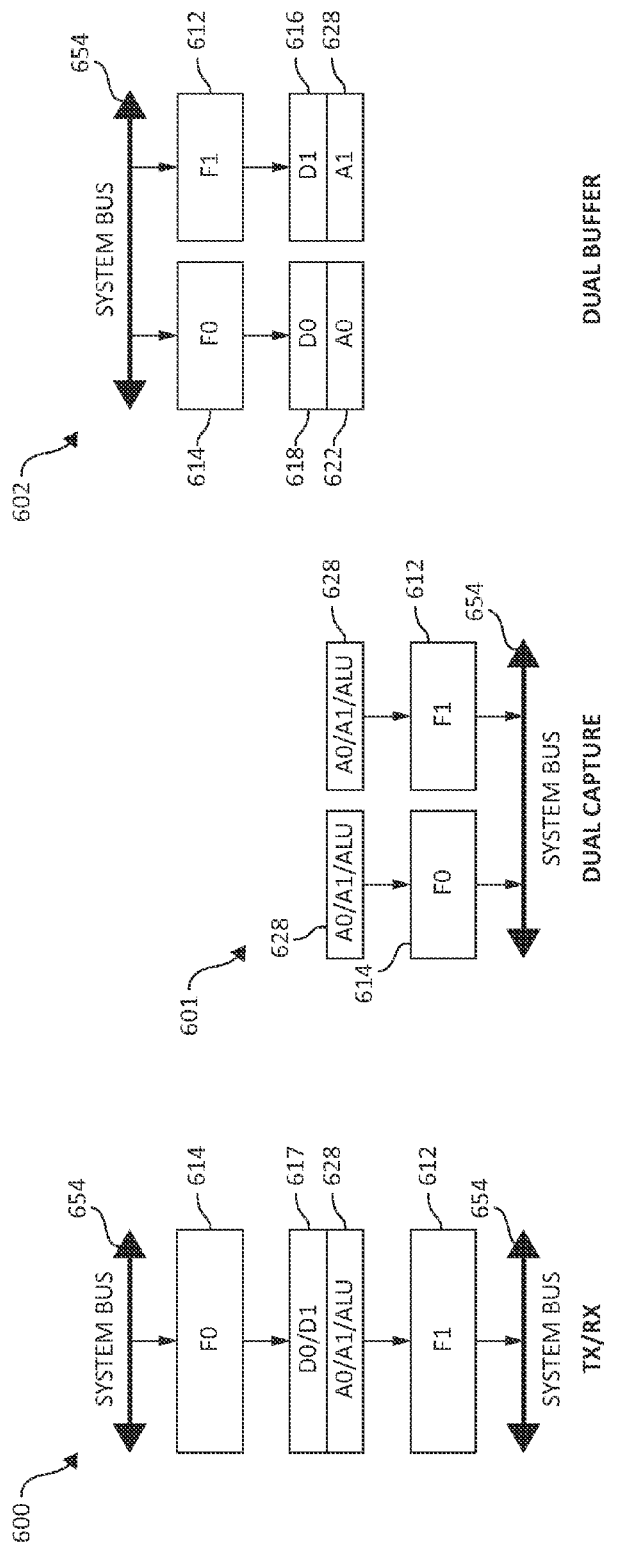
FIG. 6A illustrates a FIFO configured for a transmit/receive (TXRX) function according to an embodiment.
FIG. 6B illustrates a FIFO configured dual capture function according to an embodiment.
FIG. 6C illustrates a FIFO configured for dual buffer function according to an embodiment.

FIGS. 6A-6C illustrate example FIFO configurations which may be constructed, for example, with the datapath described with respect to FIG. 5. FIG. 6A illustrates an example FIFO configuration for a transmit/receive (TXRX) function 600. System bus 654 is coupled to F0 614. F0 614 is coupled to datapath D0 in block 617 and then coupled to either accumulator A0 or ALU 528 (FIG. 5) in block 628. The output of block 628 is coupled to F1 612. F1 612 is coupled to system bus 654.

FIG. 6B illustrates an example FIFO configuration for a dual capture function 601. Accumulator A0, accumulator A1 or ALU 528 (FIG. 5) in block 628 may be coupled to either F0 614 or F1 612. F0 614 and F1 612 are coupled to system bus 654.

FIG. 6C illustrates an example FIFO configuration for a dual buffer function 602. System bus 654 is coupled to F0 614. F0 614 is coupled to datapath 618 and accumulator 622. System bus 654 is also coupled to F1 612. F1 612 is coupled to datapath D1 616 and accumulator A1 620.

Figure 7:
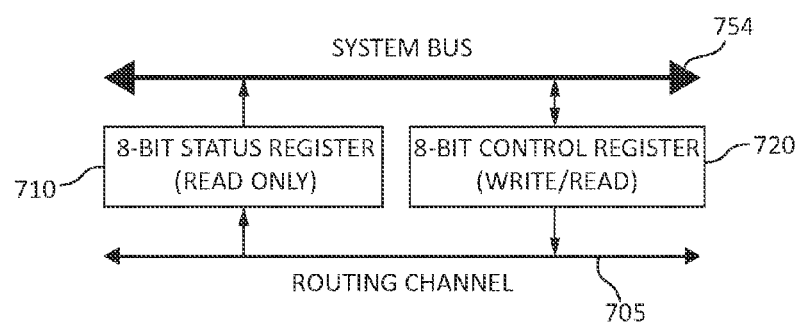
FIG. 7 illustrates a UDB status and control module according to an embodiment.

FIG. 7 illustrates a UDB status and control module 700 (e.g., 340, FIG. 3) according to one embodiment. The UDB status and control module 700 includes status register 710 and control register 720 which may be accessed and set to enable, disable, configure and reconfigure the UDBs. The status and control module 700 routes data from the datapath and places that information into a status register 710. Signals from the datapath are then easily accessible by other system components without required datapath overhead.

UDB status and control module 700 includes routing channel 705. Routing channel 705 may be coupled to status register 710 and control register 720. Status register 710 and control register 720 are coupled to system bus 754. In one embodiment, the bits of control register 720, which may be written to by the system bus 754, may be used to drive into the routing matrix and provide firmware with the opportunity to control the state of UDB processing. The status register 710 may allow the state of the UDB to be read out onto the system bus 754 directly from internal routing. Status register 710 and control register 720 may have programmable connections to the routing matrix, which allows routing connections to be made depending on the requirements of the application.

Figure 8:
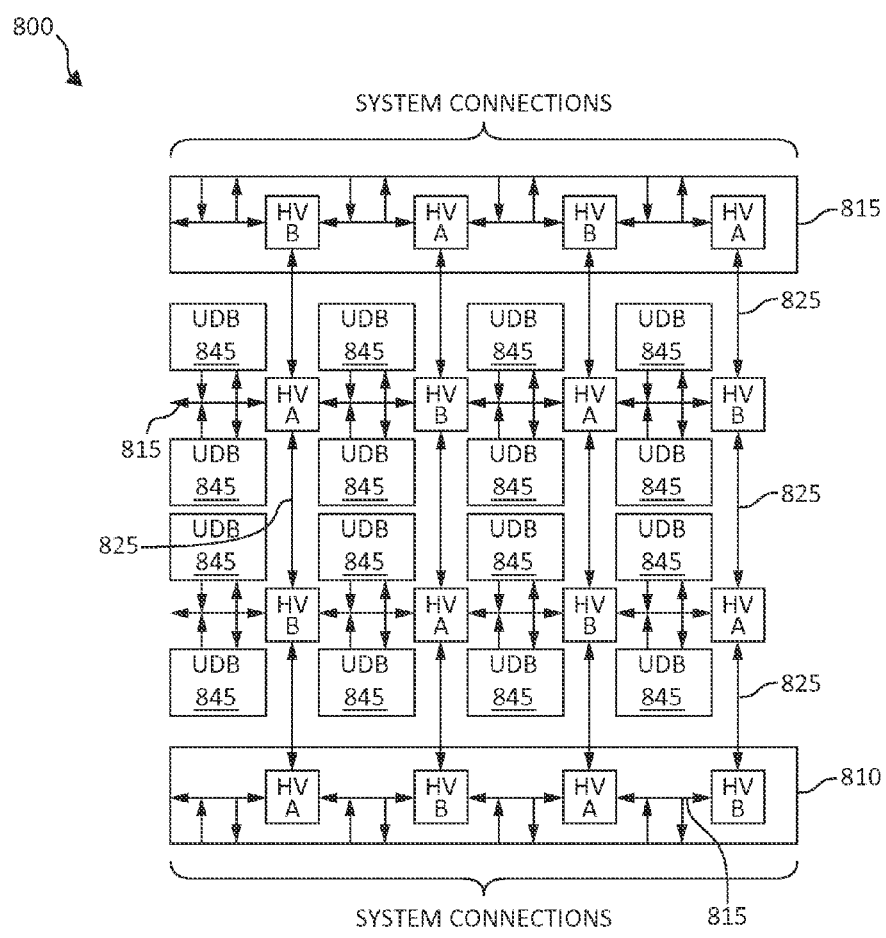
FIG. 8 illustrates a UDB array according to an embodiment.

FIG. 8 illustrates a UDB array 800 according to one embodiment. UDB array 800 includes DSI routing interfaces 805 and 810. UDB array 800 also includes horizontal and vertical (HV) routing channels 815 and 825. In one embodiment, HV routing channels 815 and 825 may include sets of wires. HV routing channels 815 and 825, wire connections to UDBs 845, and the DSI interface may be highly permutable. The permutability provides efficient automatic routing, which may allow wire-by-wire segmentation along the vertical and horizontal routing channels 815 and 825 to further increase routing flexibility and capability.

FIG. 9 illustrates a UDB array 900 according to one embodiment with digital functions mapped onto the UDB array 900. Functions are implemented by configuring UDBs 945 in an array to perform digital functions. Functions that are mapped onto the UDB array 900 include a timer 912, decoder 914, sequencer 916, PWM 918, PRS 920, I2C slave 922, SPI 924, timer 926, logic 928, SPI 930, UART 932, logic 934 and PWM 936. In this embodiment, the primary programmable resources of UDBs are two PLDs, one datapath and one status/control register. These resources may be allocated independently. UDB PLDs, datapaths and status control registers may have independently selectable clocks and may be allocated to multiple unrelated functions. As an example, timer 912 uses only one datapath in a UDB 945, which allows other resources of UDB 945 to be used for other functions, such as quadrature encoder, which may require more PLD logic that one UDB can supply. Programmable resources in the UDB array 900 may be homogenous, allowing functions to be mapped to arbitrary boundaries in the array. While UDB array 900 has functions mapped to it in such a way as to consume all of its UDBs, application requirements may require a different set of digital functions that may not use all digital resources. Additionally, the mapped functions of FIG. 9 are intended to be representative of one application. UDB array 900 may be configured to implement a different set of functions or the same functions in a different configuration.

Figure 10:
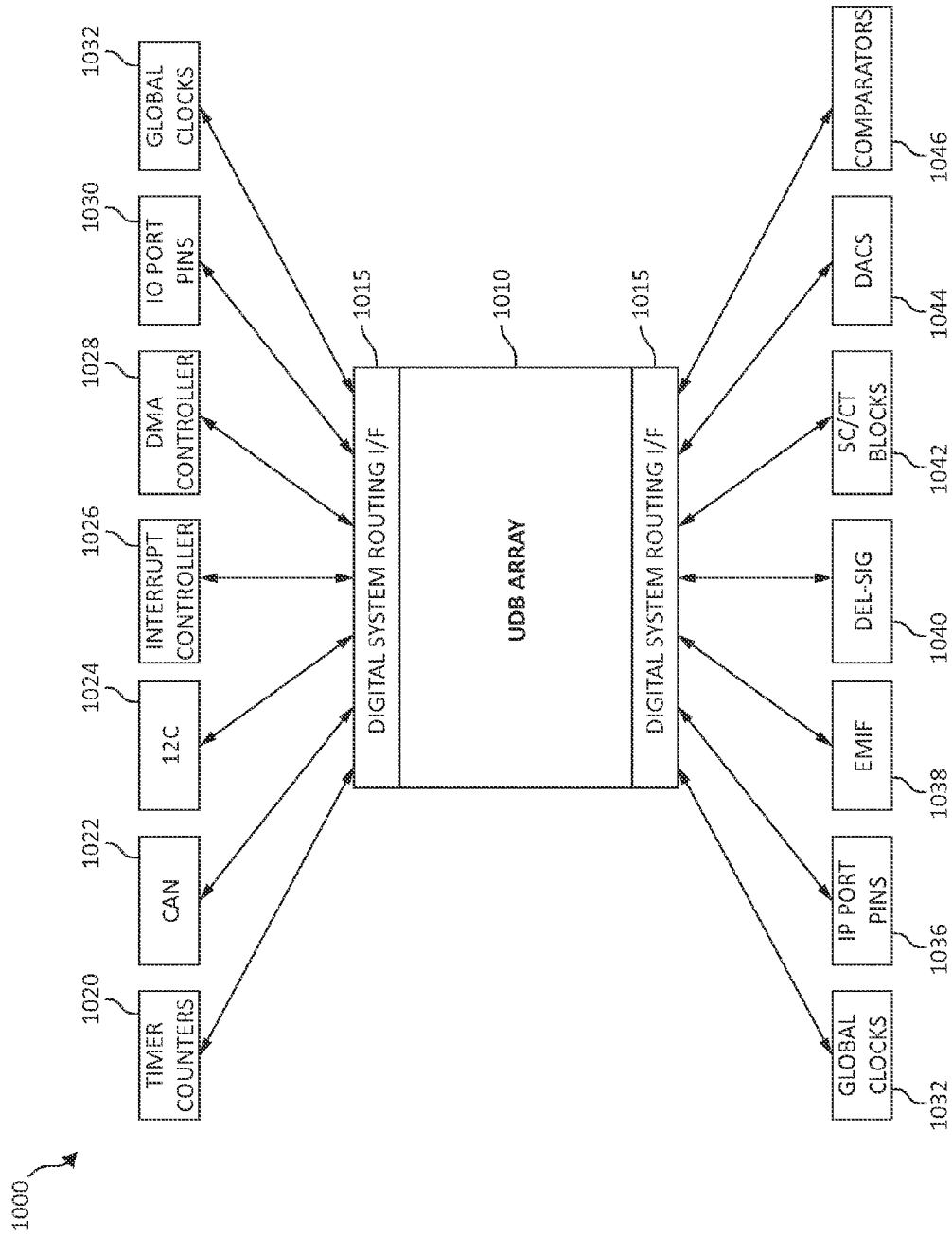
FIG. 10 illustrates a digital routing fabric in a system according to an embodiment.

FIG. 10 illustrates one embodiment of a DSI routing in an overall digital subsystem 1000. DSI 1015 may function as a continuation of the horizontal and vertical routing channels 815 and 825 (FIG. 8) at the top and bottom of an array 1010 of UDBs. The DSI may provide general purpose programmable routing between device peripherals such as UDBs (e.g., 112, FIG. 1), IOs (e.g., 104 and 106, FIG. 1), the analog subsystem (e.g., 120, FIG. 1), interrupts generated by the CPU (e.g., 141, FIG. 1), the DMA controller e.g., 144, FIG. 1) and fixed function peripherals. The DSI is used to send and receive signals to any digital resource. Signals may include inputs from IOs and peripherals, outputs from digital resources to other system elements, control signals and status queries.

In some embodiments, device peripherals that are connected by DSI 1015 may include timers and counters 1020, a CAN interface 1022, an I2C interface 1024, an interrupt controller 1026, a DMA controller 1028, IO port pins 1030, global clocks 1032, an EMIF 1038, delta-sigma ADCs 1040, SC/CT blocks 1042, DACs 1044, comparators 1046 or any other digital core or fixed function peripheral that may use programmable routing. Signals that may use programmable routing may include but are not limited to:
  interrupt requests form all digital peripherals in a system,
  DMA requests from all digital peripherals in a system
  digital peripheral data signals that need flexible routing to IOs, digital peripheral data signals that need connection to UDBs connections to the interrupt and DMA controllers connections to IO pins, and connections to analog system digital signals.

Figure 11:
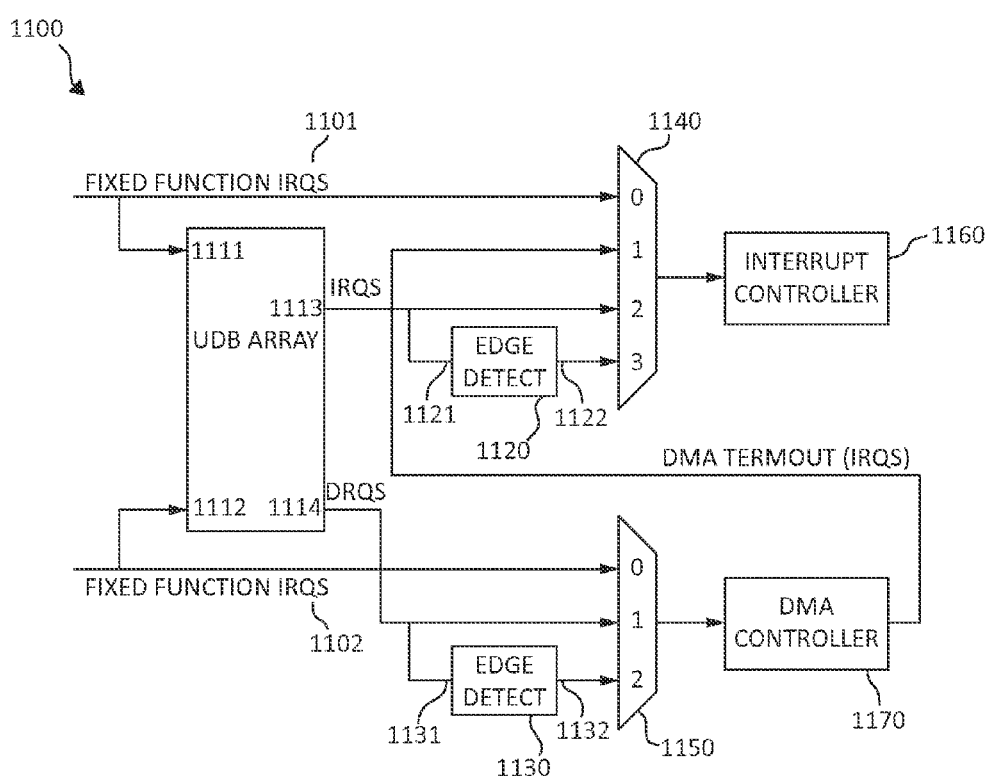
FIG. 11 illustrates an interrupt and DMA multiplexer according to an embodiment.

Embodiments including flexible interrupt and DMA routing in the DSI allow for more efficient and faster routing of signals and configuration of digital subsystem components. FIG. 11 illustrates one embodiment of an interrupt and DMA controller 1100. Fixed-function interrupt request lines (IRQs) 1101 may be routed into UDB array through input 1111 and out through output 1113. Fixed-function DRQs 1102 may be routed into UDB array 1110 through input 1112 and out through output 1114. IRQs 1103 may then be routed through an edge detect 1120 through input 1121 and output 1122. DRQs 1104 may be routed through an edge detect 1130 through input 1131 and output 1132. Fixed-function DRQs, DRQs and the output of edge detect 1130 may be routed through MUX 1150 to the input of DMA controller 1170. Fixed-function IRQs, IRQs from the UDB array 1110, the output of DMA controller 1170 and the output of edge detect 1120 may be routed through MUX 1140 to interrupt controller 1160. In one embodiment, the DMA output signal may be routed on the DSI so that the DMA output signal may be provided to UDBs, trigger interrupts, or perform other DMA, etc.

Figure 12A:
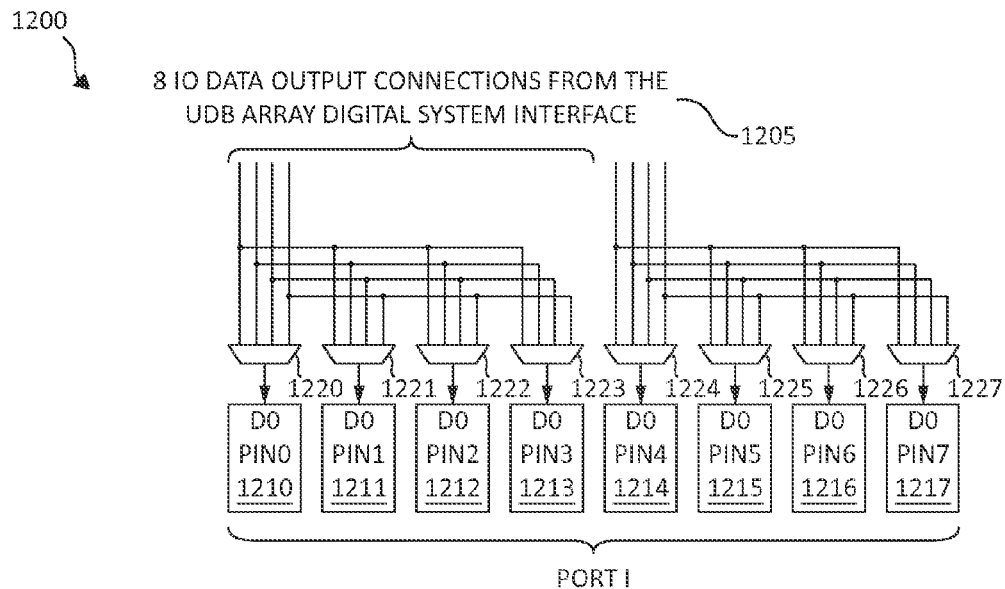
FIG. 12A illustrates IO pin output connectivity according to an embodiment.
Figure 12B:
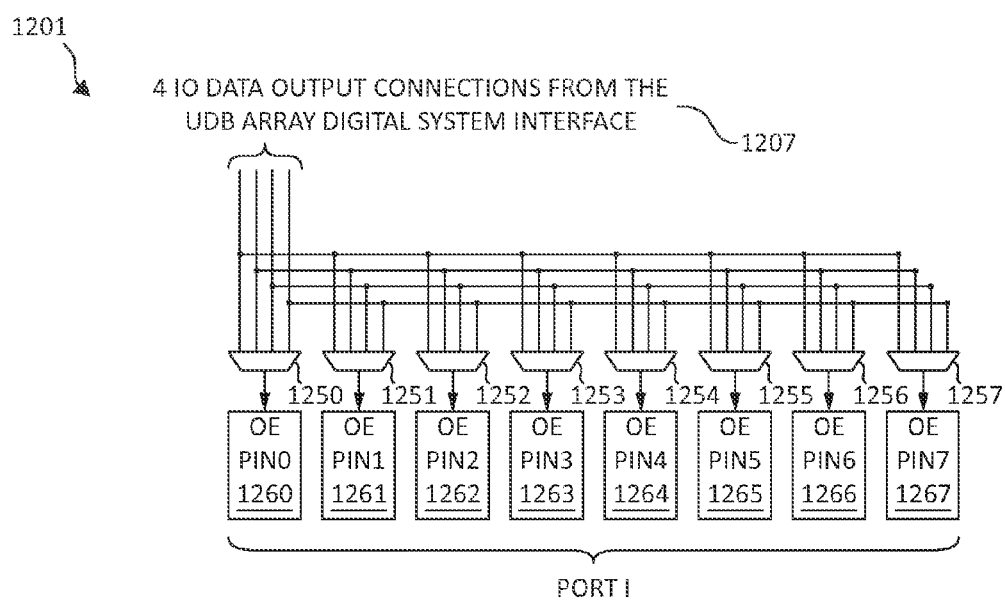
FIG. 12B illustrates IO pin output connectivity according to another embodiment.

FIG. 12A illustrates an embodiment of the IO pin output connectivity 1200. Eight IO data output connections from the UDB array DSI 1205 are routed to port pins 1210-1217 through MUXes 1220-1227. The first four data output connections from the UDB array DSI may be coupled to the first four port pins 1210-1213 through the first four MUXs 1220-1223. The second four data output connections from the UDB array DSI may be coupled to the second four port pins 1214-1217 through the second four MUXs 1224-1227. FIG. 12B illustrates another embodiment 1201 of IP pin output connectivity wherein four more DSI connections to an IO port to implement dynamic output enable control of pins. Four IO control signals connections from USB array DSI may be routed to output enable pins 1250-1257 through MUXes 1260-1267.

Figure 13:
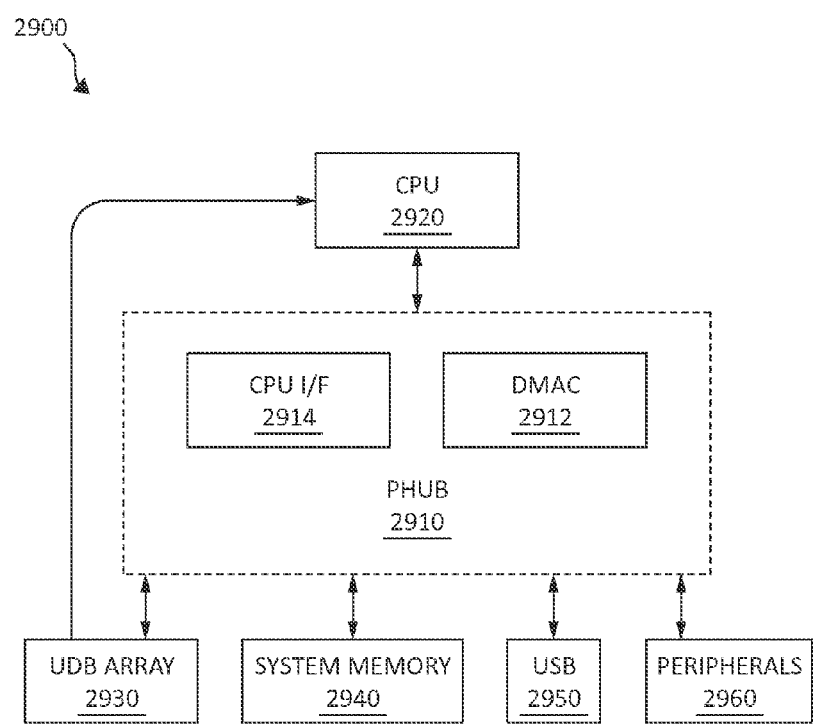
FIG. 13 illustrates a block diagram of a DMA controller in a system according to one embodiment.

FIG. 13 illustrates a block diagram of a DMA controller 2912 in a system 2900 according to one embodiment. The DMA controller (e.g. 144, FIG. 1) is part of the CPU subsystem (e.g., 140, FIG. 1), but access the memory subsystem to configure programmable analog and digital resources as well as to route signals from one system element to another without increasing CPU bandwidth overhead. The DMA may be invoked by the interrupt controller, by elements of the digital subsystem or by the CPU (e.g., 141, FIG. 1).

DMA controller 2912 and a CPU interface (CPU I/F) 2914 are part of a peripheral hub (PHUB) 2910. PHUB 2910 may be coupled to the UDB array 2930 shown in FIG. 2, the memory subsystem (e.g., 135, FIG. 1), the USB controller 2950 or other system peripherals 2960, which may include elements of the analog subsystem (FIG. 18), the digital subsystem (FIG. 2) or system-wide resources (e.g., 160, FIG. 1). The DMA controller 2912, through the PHUB 2910 may be coupled to the CPU 2920 (e.g., 141, FIG. 1), which may also receive signals from the UDB array 2930.

Flash memory provides nonvolatile storage for user firmware, user configuration data, bulk data storage and optional error correcting code (ECC). In some embodiments, flash space may be allocated to ECC specifically. In other embodiments, the flash space allocated to ECC may be reallocated to other flash memory functions when not used for ECC. ECC may correct and detect errors in firmware memory. In some embodiments an interrupt may be generated when an error is detected.

Programming of flash memory may be performed through a special interface and preempt code execution out of flash memory. The flash programming interface may perform flash erasing, programming and setting code protection levels. Flash in-system serial programming (ISSP), typically used for production programming, may be possible through both the SWD and JTAG interfaces. In-system programming, typically used for bootloaders, may be completed through interfaces such as I2C, USB, UART, SPI or other communication protocols. Flash memory may include a flexible flash protection model that prevents access and visibility to on-chip flash memory. The flash protection module may prevent duplication or reverse engineering of proprietary code.

EEPROM memory may be a byte addressable nonvolatile memory. Reads from EEPROM may be random access at the byte level. Reads may be completed directly; writes may be completed by sending write commands to an EEPROM programming interface. CPU code execution may continue using programs stored in flash memory during EEPROM writes. EEPROM may be erasable and writeable at the row level. In some embodiments, EEPROM may be divided into 128 rows of 16 bytes each. In other embodiments, EEPROM may be divided into more or fewer rows or more or fewer bytes.

Figure 14:
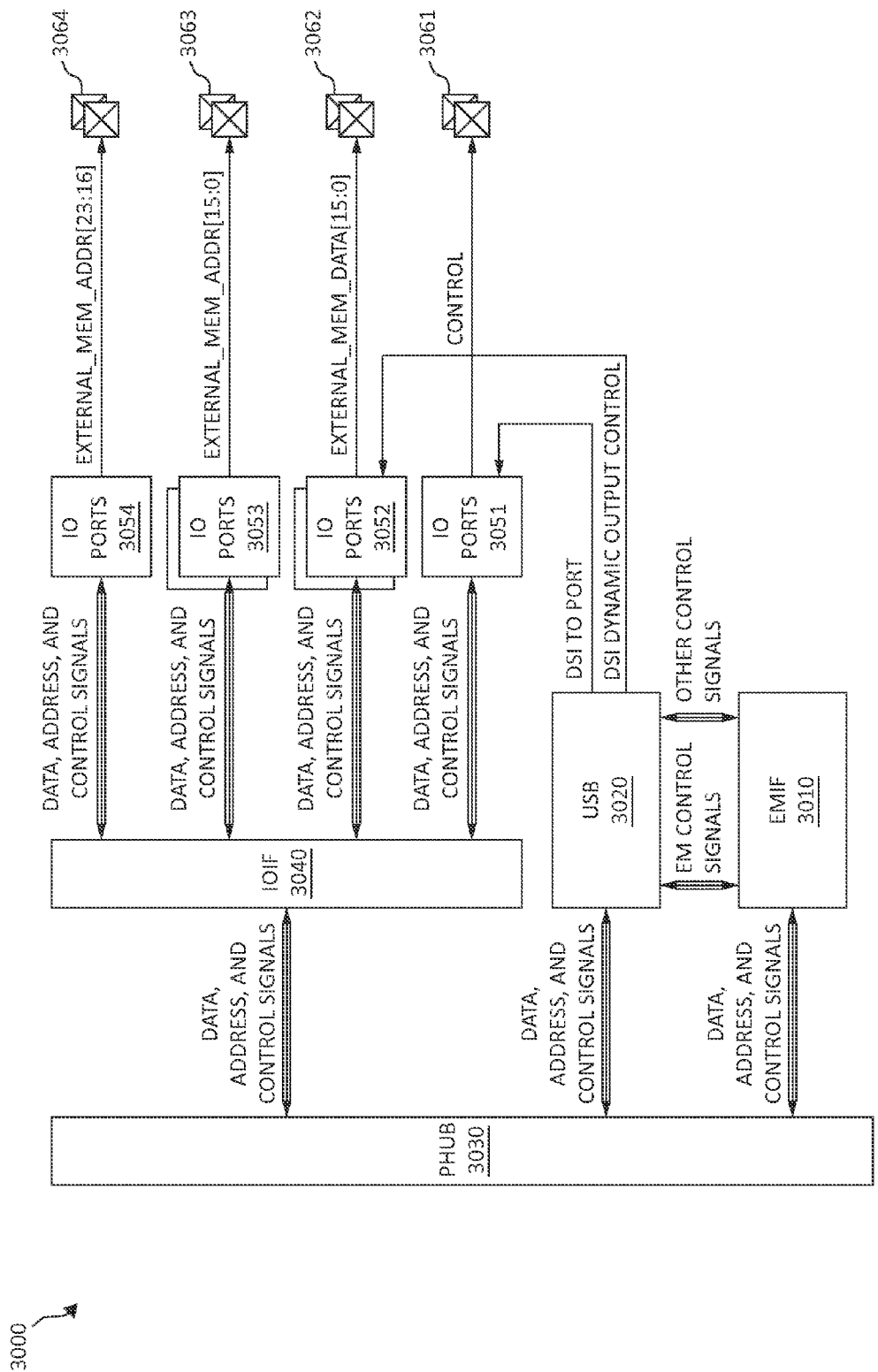
FIG. 14 illustrates one embodiment of an EMIF in a system.

FIG. 14 illustrates one embodiment of an EMIF 3010 in a system 3000. EMIF 3010 is coupled to a UDB array 3020 for sending and receiving of EM control signals and other control signals. EMIF 3010 is coupled to PHUB 3030 for sending and receiving data, address and control signals. PHUB 3030 is coupled UDB array 3020 for sending and receiving data, address and control signals. PHUB 3030 is coupled to IO interface (IO IF) 3040 for sending and receiving data, address and control signals. IO IF 3040 and UDB array 3020 (through the DSI) are coupled to IO ports 3051 for connection to pin 3061 for control. IO IF 3040 and UDB 3020 (through DSI dynamic output control) are coupled to IO port 3052 for connection to pin 3062 for control of external memory data. IO IF 3040 is coupled to IO port 3053 for connection to pin 3063 for control for external memory addressing. EMIF 3010 may allow read and write accesses to external memories. EMIF 3010 may support synchronous and asynchronous memories, and may support either one type of memory at a time or both simultaneously.

Figure 15:
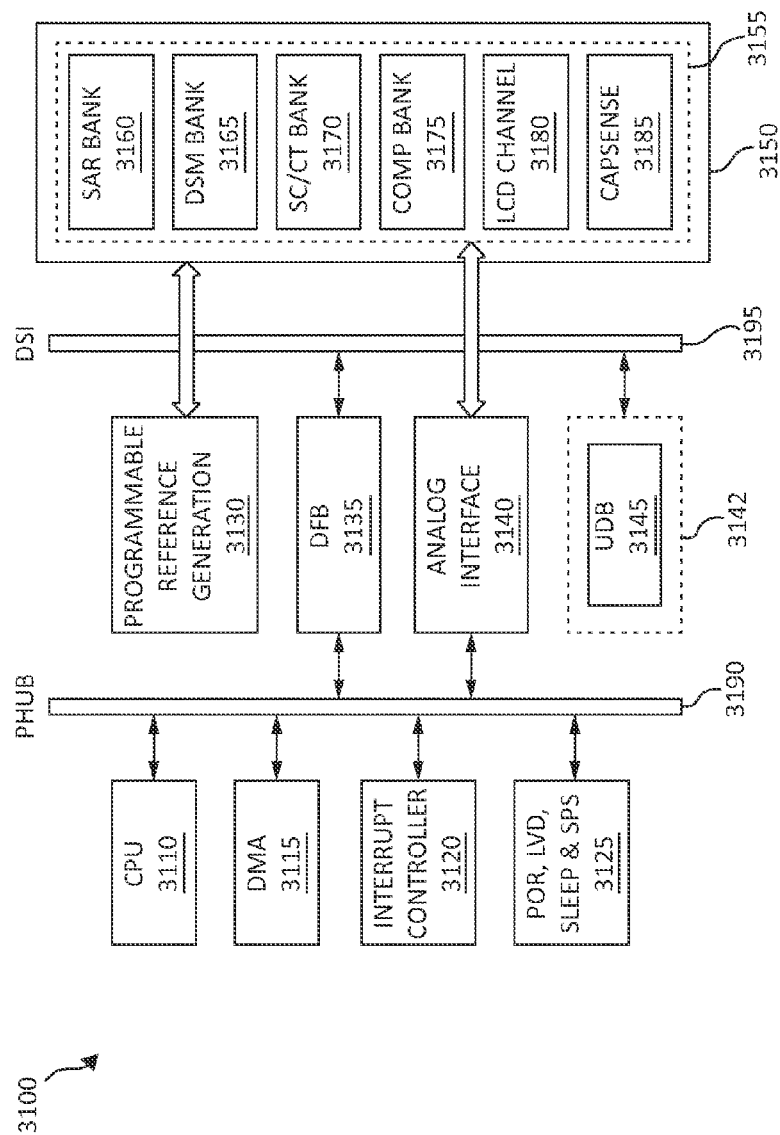
FIG. 15 illustrates another embodiment of a programmable analog subsystem.

FIG. 15 illustrates another embodiment of a programmable analog subsystem 3100 (e.g., 120, FIG. 1). CPU 3110, DMA 3115, Interrupt Controller 3120 and power block (POR, LVD, Sleep & SPC) 3125 are coupled to the PHUB, 3190. Also coupled to the PHUB 3190 are the DFB 3135 and analog interface controller 3140. DFB 3135 and a plurality of UDBs 3145, which are part of a UDB array 3142, are coupled to the DSI 3195. Analog interface 3140 is coupled to the analog subsystem 3155 which comprises a bank of SAR DACs 3160, a bank of DSMs 3165, a bank of SC/CT functional blocks 3170, a bank of comparators 3175, and LCD channel 3180 and a capacitive sensing (CapSense™) channel 3185. SAR DAC bank 3160, DSM bank 3165, SC/CT bank 3170, COMP bank 3175, LCD channel 3180 and CapSense channel 3185 may be coupled to DSI 3195. A programmable reference generation block 3130 may be coupled to the analog subsystem 1350.

Reconfigurable routing of the analog subsystem allows IOs to be routed to any analog resource as a bank of functions (DAC, comparators, SC/CT functional blocks, opamps, etc.). Additionally, reconfigurable routing of the analog subsystem may allow intra-block routing or intra-channel routing for specific functions (DAC, comparators, SC/CT functional blocks, opamps, etc.). The reconfigurable routing may be controlled by the microprocessor (CPU), the DMA, register interfaces or by programmable digital logic. In one embodiment, UDBs may be configured to provide the programmable digital logic that controls the analog reconfigurability.

Signal processing characteristics of analog and mixed-signal blocks, banks (of blocks) or channels may be controlled by programmable digital logic regardless of their type. For example, an ADC and a comparator, which are not part of the same analog block or bank or channel may be reconfigured to output or process signals by the same control element, such as a UDB or DMA controller.

Data and clock signals from analog and mixed-signal blocks, banks or channels may be routed on-chip to other analog and mixed signal blocks, banks or channels or to digital subsystem components to extend the signal processing capability of the device. For example a digital filtering of an ADC output, spread spectrum clocking and clocking with variable jitter may be accomplished by routing analog and mixed-signal outputs through the programmable interconnect to other on-chip elements.

Additionally, analog and mixed-signal blocks, banks and channels may be controlled synchronously or asynchronously by digital signals from the clocking or digital subsystems through analog routing.

As discussed above, a UDB (e.g., peripheral function engine) includes a datapath, PLDs, a status and control block, and a clock and reset control block. In one embodiment, the data path may be where a majority of arithmetic and computational operations are formed. For example, if an 8-bit counter is implemented using a UDB (e.g., peripheral function engine) the increment and decrement functions may be implemented in the datapath. In one embodiment, the datapath may be a configurable ALU with configurable FIFOs and working registers. The datapath may have no program memory associated with it. The datapath may be programmed with different op-codes that may cause the ALU to perform different functions (e.g., adding, subtracting, incrementing, decrementing, XORing, ANDing, multiplying, shifting, etc.) In one embodiment, the PLDs may control the operation of the datapath. For example, the PLDs may be used to control the order of operations performed by the data path. Many functions, operations, actions, and/or tasks may be performed using the datapaths and PLDs of the UDBs. For example, a delta sigma modulator, cyclic redundancy check, or I2C component may be implemented using UDBs. In one embodiment, the PLDs can be chained together to create larger implementations of a function as well. For example, multiple PLDs from multiple UDBs may be chained together to implement a 16-bit counter instead of an 8-bit counter.

In one embodiment, the status and control block may be used as an interface with the rest of the system (e.g., the other components of the PSoC™). For example, the status and control blocks of different UDBs may be connected to facilitate a higher level control of the UDBs (e.g., changing modes, speeds, reading component status, etc.). The status and control block may also be a public location for control or status data for the different components of the system. The status and control block may function as an interface between the firmware and digital domains.

When performing more complicated tasks, functions, or operations, a single UDB or multiple chained UDBs may be insufficient. For example, implementing a single pole IIR filter or a square root calculator may use a more complicated configuration of UDBs (e.g., an array of peripheral function engines). In one embodiment, the datapaths of a first set of UDBs may perform calculations that help control the datapaths of another set of UDBs that are performing the arithmetic or logical operations. For example, as discussed further below in conjunction with FIGS. 18A and 18B, when configuring UDBs to calculate the square root of a number, a first datapath in one UDB may be a counter whose maximum value is constantly decrementing. This helps the other datapaths in the other UDBs keep track of shifting. The datapaths in the first set of UDBs may be controlled by a state machine (e.g., by PLDs). The other datapaths may be chained or may execute different functions in parallel. The state machines are implemented in the PLDs to control each set of datapaths. DMA may be configured to facilitate data transfer between different datapaths in different UDBs, between RAM, and between status and control blocks.

In one embodiment, datapaths may be configured by specifying the op-codes that the datapaths may execute. For example, when configuring UDBs to perform square root calculations, the square root calculation algorithm may be divided into a finite set of operations and the order in which the operations should be executed. These operations may be mapped to the capabilities of the UDBs datapath. For example, addition may be mapped to addition capabilities of the datapath, multiplication may be mapped to a series of shifts and additions capabilities of the datapath, etc. These operations sometimes may be combined with other operations to save program space. Some operations may involve movement or sharing of data between datapaths, or from one datapath's output to the same datapath's input, etc. DMA may be used to move or share data between datapaths or UDBs. Datapaths may be configured using a configuration tool, such as an application, program, software module, or software component, that may be executed by a SoC (e.g., by the CPU of a SoC). In one embodiment, the configuration tool may translate data such as op-codes, mask values, shift preferences, etc., into a Verilog macro or code. The Verilog macro or code may be used to configure the datapath when programming the SoC.

The DMA may be configured using a programming language (e.g., the C programming language or another high level language) or using application programming interfaces (APIs). The APIs may be used to translate abstract functions like allocating a memory location (e.g., a register) to the register writes executed by the CPU to the DMA Controller (DMAC). In one embodiment, the DMA may be configured by the CPU (e.g., when the SoC starts up) to respond to digital signals from the datapaths or their controlling state-machines implemented in PLDs. In one embodiment, by configuring the DMA to couple datapaths to each other, when a datapath indicates that the datapath has completed a certain step of the calculation, a logic signal connected to a DMA channel's input request terminal may be set to high. This may cause the datapath's result to be moved to its destination. In one embodiment, a Verilog macro or code may be also be used to configure the PLDs when programming the SoC.

Figure 16A:
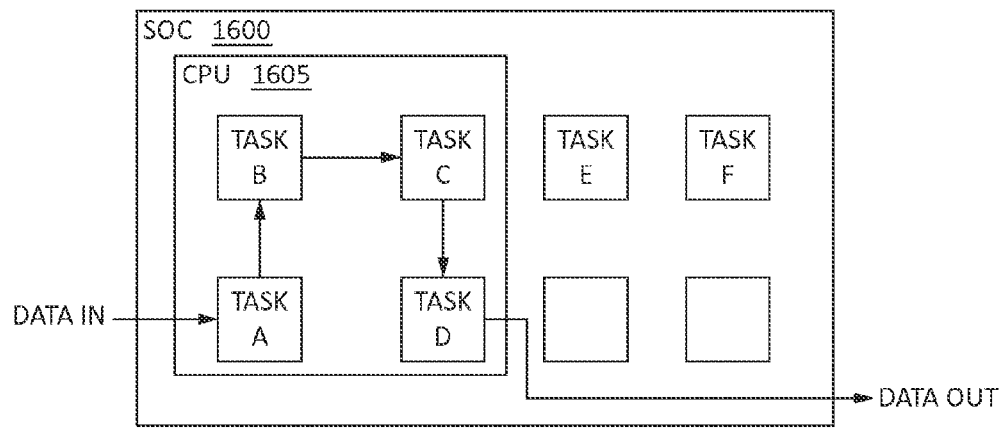
FIG. 16A is a block diagram illustrating a SoC, according to one embodiment.

FIG. 16A is a block diagram illustrating a SoC 1600, according to one embodiment. The SoC 1600 includes a CPU 1605 and UDB's 1610. As discussed above, each UDB 1610 may include a data path (e.g., a configurable ALU) and a PLD. In one embodiment, the SoC 1600 may perform the functions of an I2C slave for an I2C communications interface. The tasks performed by the I2C slave may include task A, task B, task, C, and task D. Task E and F may be additional tasks not related to the I2C slave that are performed using the UDBs 1610. In one embodiment, a task may be any action, function, operation, etc., that SoC 1600 may perform. For example, a task may include calculating a square root, counting the number of rising edges observed in a signal, filtering a measured analog signal, etc. Data is provided to the CPU 1605 via a data in line and the CPU performs tasks A, B, C, and D using the data. Tasks A, B, C, and D may include functions such as filtering, signal processing, comparison of values, management of an internal process, buffering, serialization of parallel data, etc. In one embodiment, the CPU 1605 may process the input data and serialize the input data into the I2C interface manually (e.g., "bit-banging"). The resulting serialized data is provided to the I2C communications interface via the data out lines. As illustrated in FIG. 16A, the majority of the tasks (e.g., task A through D) are performed by the CPU 1605 which may use more of the processing resources of the CPU 1605. This may cause the CPU 1605 to perform additional functions more slowly or to respond to requests more slowly.

Figure 16B:
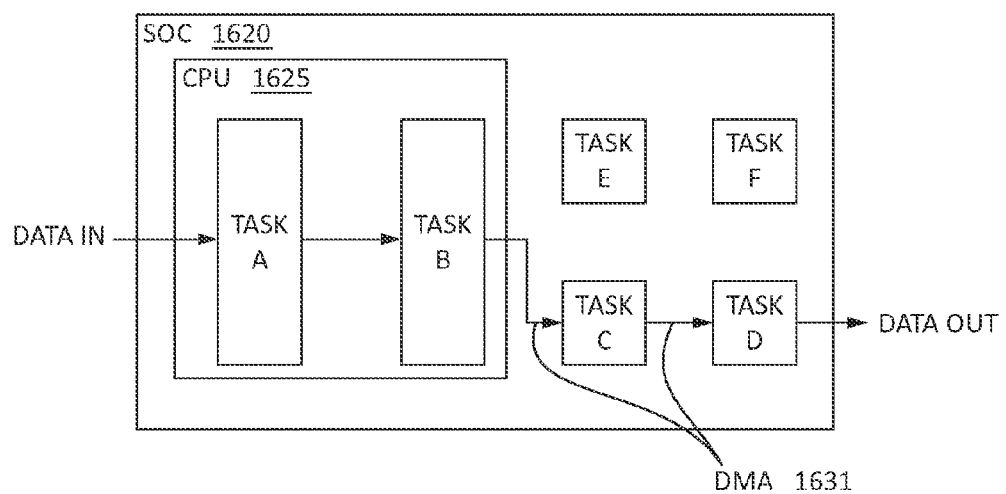
FIG. 16B is a block diagram illustrating an SoC, according to another embodiment.

FIG. 16B is a block diagram illustrating an SoC 1620, according to another embodiment. The SoC 1620 includes a CPU 1625 and UDB's 1630. As discussed above, each UDB 1630 may include a data path (e.g., a configurable ALU) and a PLD. In one embodiment, the SoC 1600 may perform the functions of an I2C slave for an I2C communications interface. The tasks performed by the I2C slave may include task A, task B, task, C, and task D. As illustrated in FIG. 16B, instead of having the CPU 1625 perform all of the tasks A through D, tasks C and D are offloaded to two of the UDBs 1630. This may allow a majority of the low level interface for the I2C slave to be handled by the UDBs 1630 hardware using the datapaths and PLDs in the UDBs 1630. The UDBs 1630 may be coupled to each other and the CPU 1625 using DMA 1631. Shifting serial data in and out of the I2C slave may be performed by the datapaths of the UDBs 1630. Read, write, and address decoding operations may be performed by the PLDs which may be configured as state machines to interpret input data. The state machines (e.g., the PLDs of the UDBs 1630) may facilitate read and write operations to the I2C communications interface using DMA to transfer data in and out of SRAM buffers dedicated to the I2C communications interface. The state machines may also generate interrupts for tasks that require the intervention of CPU 1625 (e.g., new data is sent or a host device is requesting a complex action). By offloading tasks C and D to the UDBs 1630 and performing tasks A and B, the CPU 1625 may use fewer processing resources or may use processing resources for a smaller amount of time than when performing tasks A through D.

Figure 16C:
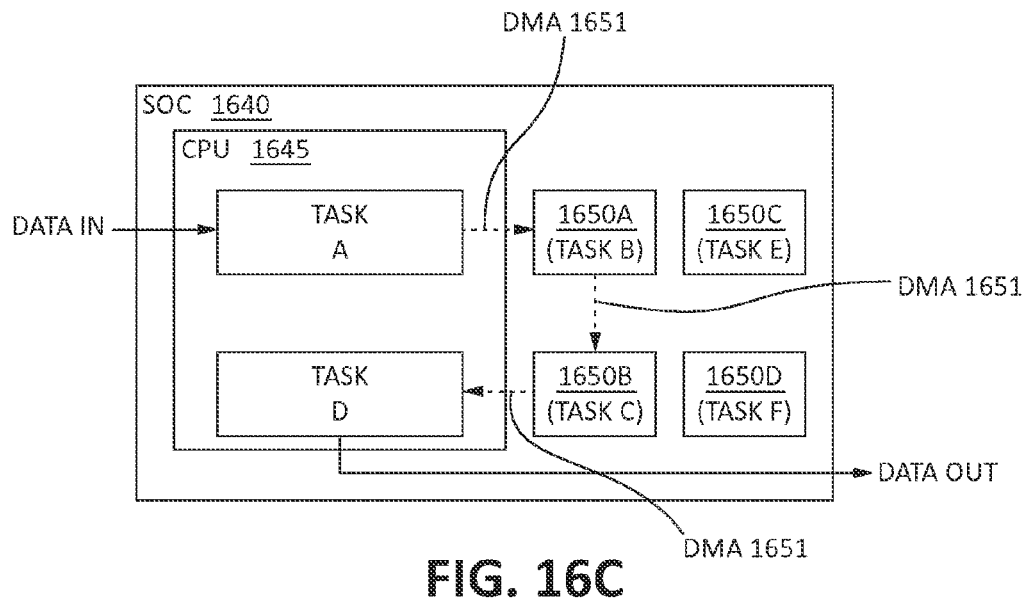
FIG. 16C is a block diagram illustrating an SoC, according to a further embodiment.

FIG. 16C is a block diagram illustrating an SoC 1640, according to another embodiment. The SoC 1640 includes a CPU 1645 and UDB's 1650. As discussed above, each UDB 1650 may include a data path (e.g., a configurable ALU) and a PLD. In one embodiment, the SoC 1640 may perform a root mean square (RMS) calculation. The tasks to perform the RMS calculation may include task A, task B, task, C, and task D. As illustrated in FIG. 16C, instead of having the CPU 1645 perform all of the tasks A through D, tasks B and C are offloaded to two of the UDBs 1650. The CPU 1645 may take a sample value, square the sample value, and store it in memory. The CPU 1645 may then toggle a bit notifying the UDBs 1650 that the data is ready for processing. The datapath and the PLD in the UDB 1650A may be configured to compute averages and may which accesses the data stored by the CPU 1645 via DMA 1651. When a sufficient number of samples have been accrued, the computed average value is sent via DMA 1651 to UDB 1650B. The datapath and PLD of UDB 1650B may be configured to compute square roots. Once this calculation is complete, the result is stored in memory via DMA 1651 and the CPU 1645 is notified that the RMS calculation is complete. By offloading task B (e.g., computing an average) and task C (e.g., computing a square root) to the UDBs 1650 and performing tasks A and D, the CPU 1645 may use fewer processing resource or may use processing resources for a smaller amount of time than when performing tasks A through D.

Figure 16D:
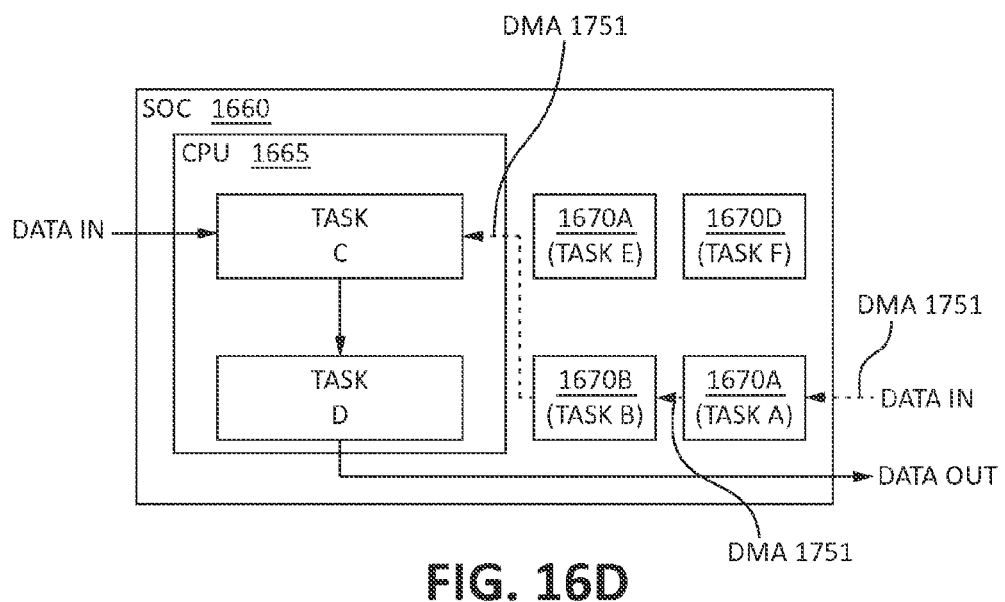
FIG. 16D is a block diagram illustrating an SoC, according to yet another embodiment.

FIG. 16D is a block diagram illustrating an SoC 1660, according to another embodiment. The SoC 1660 includes a CPU 1665 and UDB's 1670. As discussed above, each UDB 1670 may include a data path (e.g., a configurable ALU) and a PLD. In one embodiment, the SoC 1660 may implement first order infinite impulse response (IIR) filters. The tasks to implement the IIR filters may include task A, task B, task, C, and task D. Input data may be transferred to UDB 1670A using DMA 1671. The datapath and PLD of the UDB 1670A may be configured to apply shifts to the data to emulate multiplication by a constant, to perform additions on the data and to store the result. The UDB 1670A may provide the result to the UDB 1670B which may perform additional operations on the data and may transfer the data to the CPU 1665 via DMA 1671. As illustrated in FIG. 16D, instead of having the CPU 1665 perform all of the tasks A through D, tasks A and B are offloaded to two of the UDBs 1670. By offloading task A and task B to the UDBs 1630 and performing tasks A and D, the CPU 1625 may use fewer processing resource or may use processing resources for a smaller amount of time than when performing tasks A through D.

Figure 17A:
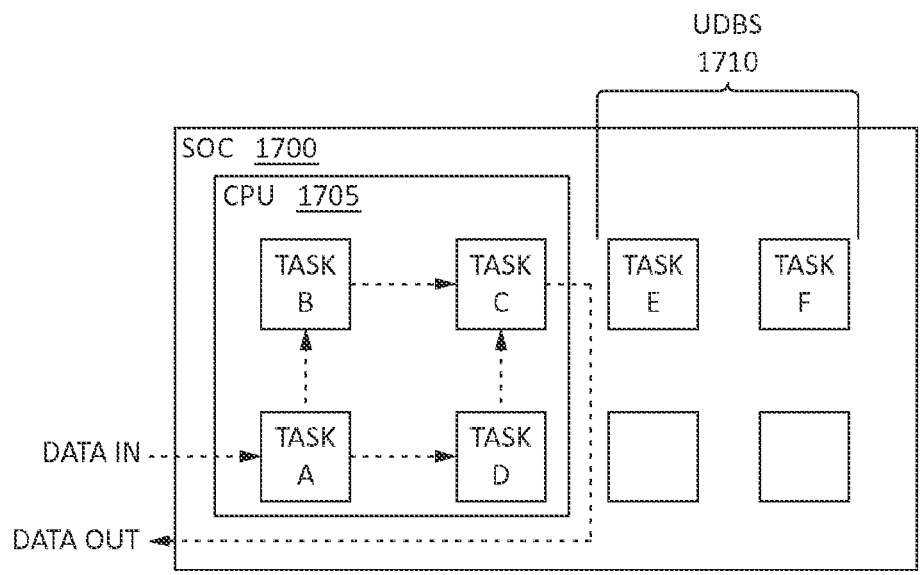
FIG. 17A is a block diagram illustrating a SoC, according to one embodiment.

FIG. 17A is a block diagram illustrating a SoC 1700, according to one embodiment. The SoC 1700 includes a CPU 1705 and UDB's 1710. As discussed above, each UDB 1710 may include a data path (e.g., a configurable ALU) and a PLD. In one embodiment, the SoC 1700 may perform signal acquisition utilizing automatic gain control (AGC). Task A may perform initial filtering of an acquired signal. Task B may be an AGC component that continuously monitors the task A output, indicating to task D what level of amplification should be applied to the signal. Task C may be additional signal processing such as envelope detection or half-wave rectification. Task D may be a gain state that amplifies the signal, the amount of which is controlled by task C. Data is provided to the CPU 1705 via a data in line and the CPU performs tasks A, B, C, and D using the data. The CPU 1705 filters the data and calculates the gain. The CPU 1705 determines whether the gain should be changed (e.g., increased or decreased) by determining whether the gain is within a threshold range. As illustrated in FIG. 17A, all of the tasks A through D are performed by the CPU 1705 which may use more of the processing resources of the CPU 1705. This may also cause the CPU 1705 to perform additional functions more slowly or to respond to requests more slowly. This may also cause the SoC to consume more power due to less time spent in a sleep state.

Figure 17B:
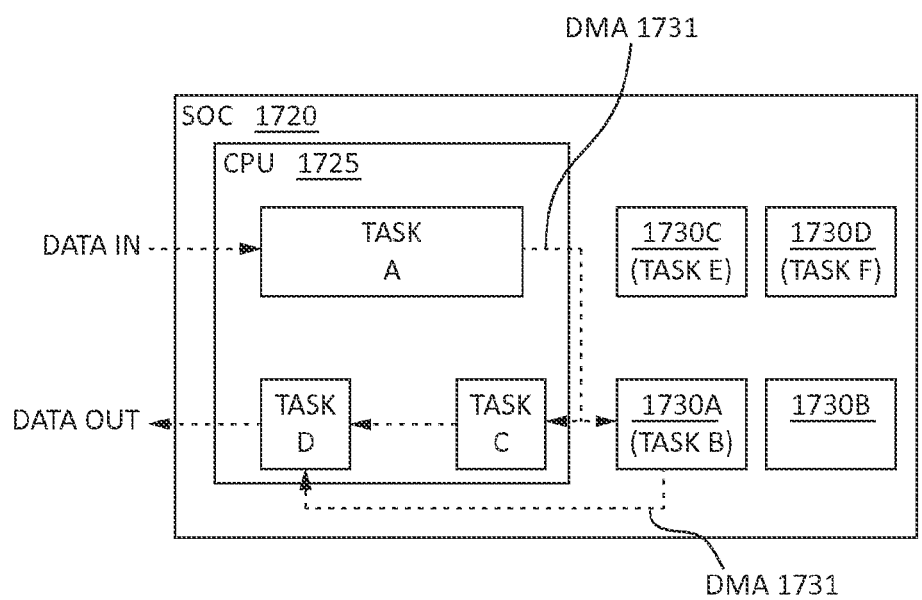
FIG. 17B is a block diagram illustrating an SoC, according to another embodiment.

FIG. 17B is a block diagram illustrating an SoC 1720, according to another embodiment. The SoC 1720 includes a CPU 1725 and UDBs 1730. As discussed above, each UDB 1730 may include a data path (e.g., a configurable ALU) and a PLD. In one embodiment, the SoC 1700 may perform automatic gain control (AGC). The tasks performed when performing AGC may include task A, task B, task, C, and task D. As illustrated in FIG. 17B, instead of having the CPU 1725 perform all of the tasks A through D, task B is offloaded to UDB 1730A. Input data is provided to the CPU 1725 via a data in line and the CPU 1725 filters the data and calculates the gain. The gain value is provided to the UDB 1730A via DMA and the datapath and PLD of UDB 1730A are configured to determine whether the gain is within a threshold range. The UDB 1730A may report to the CPU 1725 whether the gain should be changed via the DMA 1731 or a configurable digital interconnect (not shown in the FIG. 17B)

between the UDBs 1730 and the CPU 1725. By offloading task B to the UDB 1730A and performing tasks A, C, and D, the CPU 1725 may use fewer processing resource or may use processing resources for a smaller amount of time than when performing tasks A through D. This also allows the SoC 1720 to consume less power, as it allows for faster completion of processing and longer sleep states.

In other embodiments, an array of UDBs may be coupled together and configured to perform other functions such as signal demodulation, voltage rail monitoring, and digital filter chains.

Figure 18A:
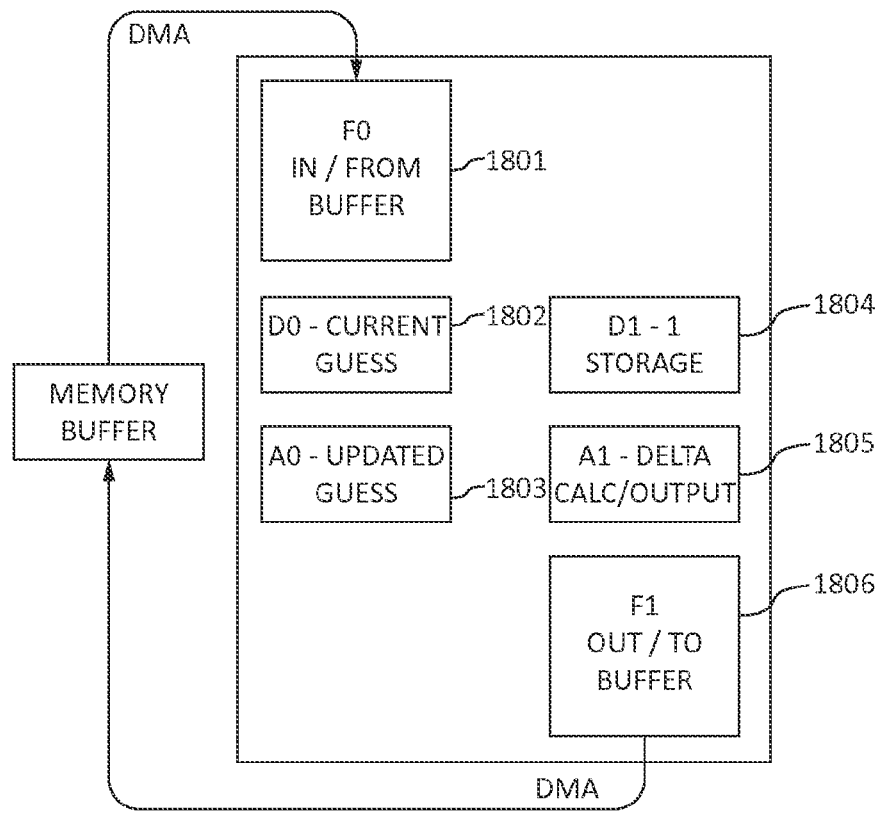
FIG. 18A is a block diagram illustrating a computational datapath according to one embodiment.
Figure 18B:
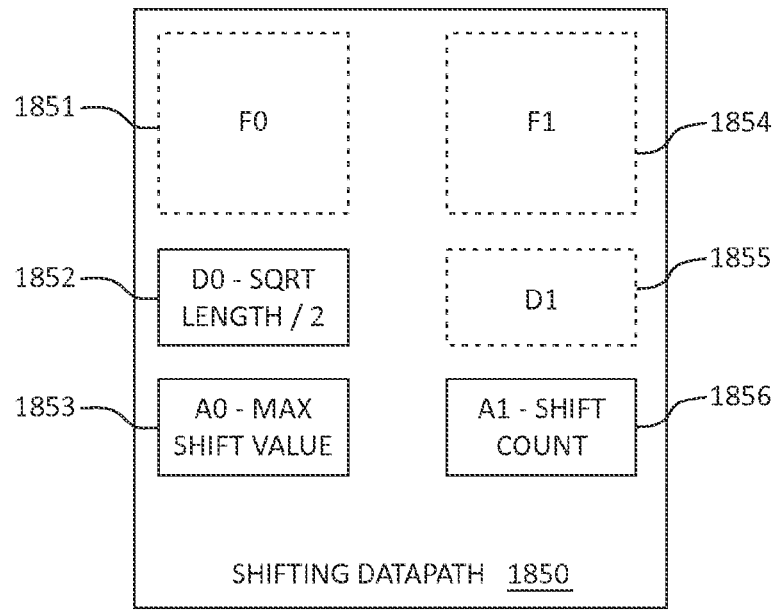
FIG. 18B is a block diagram illustrating a shifting datapath according to one embodiment.

FIGS. 18A and 18B illustrate datapaths that may be used in an array of UDBs configured to calculate an integer square root. In one embodiment, the array of UDBs may implement a Newton-Raphson iteration method for calculating an integer square root. The Newton-Raphson iteration method is a method of successive iteration, in which a guess of the square root of an integer is continually updated and checked until the result is within a threshold (e.g., less than 1 count of error). The operations that may be performed when implementing the Newton-Raphson iteration method may be 1) addition, 2) subtraction, 3) left shifting, and 4) moving data in memory.

In one embodiment, two configurations of UDBs may be used to calculate the square root using the Newton-Raphson iteration method. The first UDB configuration has a shifting datapath, which keeps track of shifting used for multiplication in the Newton-Raphson iteration method. The other UDB configuration has a computational datapath which will perform the arithmetic or logical operations to calculate the square root. There may be "X" number of the computational datapaths used, wherein "X" is the number of bytes in the input value. The UDB with the shifting datapath is used because the number of shifts performed in the Newton-Raphson iteration method should decrement over the course of the square root calculation. In one embodiment, a state machine is implemented in PLDs of the UDBs to control which op-codes are selected in each cycle. The state machine receives status inputs from the datapaths (via a configurable digital interconnect) and outputs op-code selection signals to the datapaths (via the configuration digital interconnect).

FIG. 18A is a block diagram illustrating a computational datapath 1800 according to one embodiment. The computational data path 1800 may square a current guess and compare it with a value, and conditionally add a shifted value to the current guess based on the result of the comparison. The datapath includes registers 1801, 1802, 1803, 1804, 1805, and 1806 that may be used to store data and values used when calculating the square root. Register 1801 may receive input from a memory buffer via DMA and may store the input. Register 1802 stores a current guess of the square root value. Register 1803 stores an updated guess of the square root value. Register 1804 stores the value "1." Register 1805 stores a delta value between the current guess and a previous guess. Register 1806 stores a value that for outputting to the memory buffer via DMA. In one embodiment, the register 1806 may store the calculated square root value and output the square root value to the memory buffer where a CPU may use the square root value.

TABLE 1

| Op Code | Operation | Description |
|---|---|---|
| 0 | Nothing | Wait |
| 1 | A1 = D1 | Get 1 from data 1 register |

TABLE 1-continued

| Op Code | Operation | Description |
|---|---|---|
| 2 | A1 = <br> A1 << 1 | Shift work register 1 left 1 <br> (used to calculate delta) |
| 3 | A1 = <br> A0 + A1 | Add delta to current guess |
| 4 | A0 = D0 | Move current guess to working register |
| 5 | A0 = F0 | Load input into working register |
| 6 | A1 = A0 | Send guess to output |
| 7 | A1 = <br> A0 − A1 | Update the current error |

The computational datapath 1800 may use the op-codes listed above in Table 1 when performing calculations or operations. The op-code "0" indicates that the computational datapath 1800 should not perform an action. The op-code "1" indicates that the computational datapath 1800 should read the value "1" from the register 1802 (e.g., register D1). The op-code "2" indicates that value in register 1805 (e.g., register A1) should be shifted left by one bit. The op-code "3" indicates that the value in register 1805 (E.g., register A1) should be added to the value in register 1805 (e.g., register A0). The op-code "4" indicates that register 1803 (e.g., register A0) should be set to the value of register 1802 (e.g., register D0). The op-code "5" indicates that register 1803 (e.g., register A0) should be set to the value of the input stored in register 1801 (e.g., register F0). The op-code "6" indicates that the register 1805 (e.g., register A1) should be set to the value of register 1803 (e.g., register A0). The op-code "7" indicates that the value of register 1805 should be set to the value of register 1803 minus the value of register 1805. In one embodiment, the different op-codes in Table 1 may be commands that are programmed into the configuration memory of the computational datapath 1800 such that the datapath will execute the operation listed in Table 1 when the computational datapath 1800 receives control input (e.g., receives input from a state machine or a PLD). It should be noted that the op-codes listed in Table 1 may not define the order in which commands are issued. The op-codes listed in Table 1 illustrate the type of commands that the computational datapath 1800 may receive from a state machine or a PLD.

FIG. 18B is a block diagram illustrating a shifting datapath 1850 according to one embodiment. The shifting datapath 1850 decrement a current shift value and send a strobe signal when the shift value has reached zero, indicating to the computational datapath(s) that they have shifted enough. The shifting datapath may also manage the maximum shift count. The datapath includes registers 1851, 1852, 1853, 1854, 1855, and 1856 that may be used to store data and values used when controlling the computational datapath 1800 illustrated in FIG. 18A. Registers 1851, 1854, and 1855 may not be used by the shifting datapath 1850. Register 1852 stores the value of the length of the square root divided by two. Register 1853 stores the maximum shift value. Register 1856 stores the current shift count. In one embodiment, in the first round of calculating the square root, the single bit shift should be performed "N"/2-1 times, N/2-2 times in the third round, etc. The shifting datapath 1850 tracks the current round's shifting limit, decrementing it each round that the square root is calculated.

TABLE 2

| Op Code | Operation | Description |
| --- | --- | --- |
| 0 | Wait | Make no changes. Also used for loading. |
| 1 | A0 = A0 − 1 | Used to keep track of $i$ over course of sqrt process |
| 2 | A1 = A1 − 1 | Used during shifting as main timer |
| 3 | A1 = A0 | Reset main counter after each shift process |
| 4 | A0 = D0 | Load $i$ from D0 register, which is static |
| 5 | A1 = A1 + 1 | Used to calculate 2Δ |
| 6 | Unused | |
| 7 | Unused | |

The datapath 1850 may use the op-codes listed above in Table 2 when tracking the current round's shifting limit. The op-code "0" indicates that the datapath 1850 should not perform an action. The op-code "1" indicates that the datapath 1850 should subtract one from the register 1853. The op-code "2" indicates the datapath 1850 should subtract one from value of register 1856. The op-code "3" indicates that the value in register 1856 should be set to the value in register 1853. The op-code "4" indicates that register 1853 should be set to the value of register 1852. The op-code "5" indicates that the value of register 1856 should be incremented by 1. The op-codes "6" and "7" are not used by the shifting datapath 1850.

Figure 19:
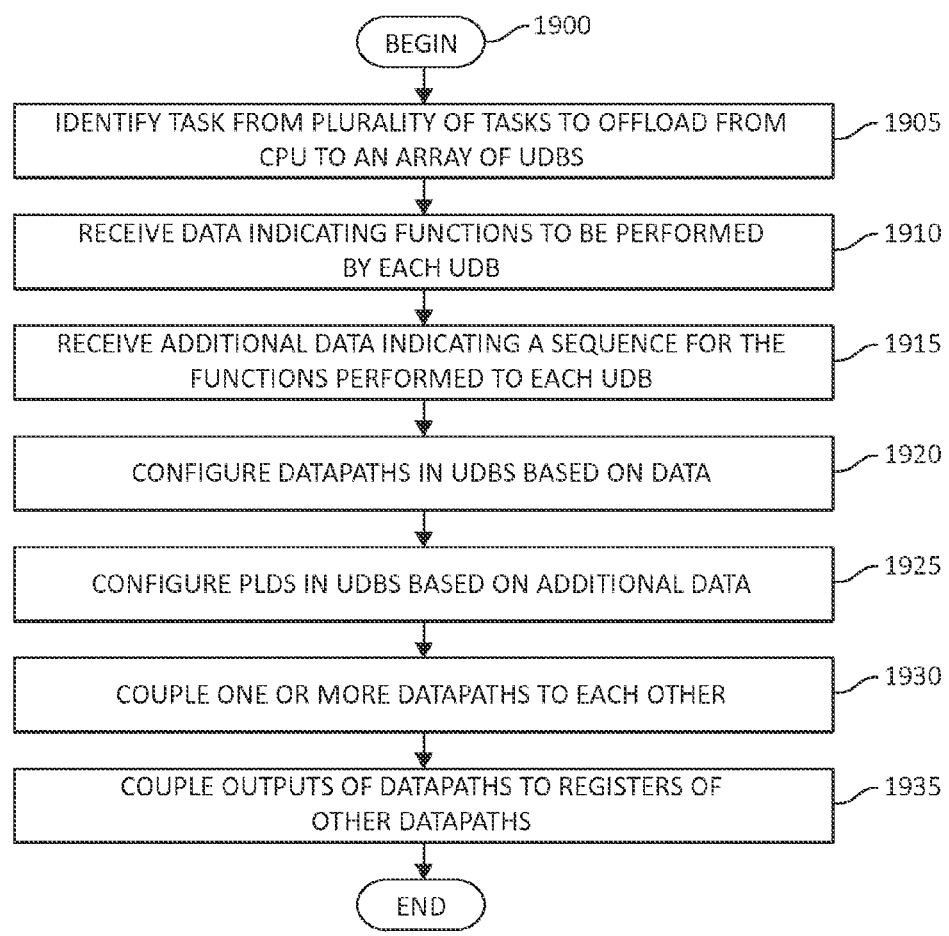
FIG. 19 is a flow chart of one embodiment of a method 900 of configuring an array of UDBs.

FIG. 19 is a flow chart of one embodiment of a method 900 of configuring an array of UDBs. The method 1900 may be performed by a device that comprises hardware (e.g., circuitry, electrodes, switches, dedicated logic, programmable logic, microcode), software (e.g., instructions run on a processing device to perform hardware simulation), or a combination thereof. In one embodiment, method 1900 may be performed by core architecture 100 as illustrated in FIG. 1.

Referring to FIG. 19, the method 1900 starts at block 1905 where the method 1900 identifies a task from a plurality of tasks to offload from a CPU to an array of UDBs (e.g., an array of peripheral function engines). In one embodiment, a user (e.g., a designing engineer) may determine that certain tasks or functions may be offloaded to the array of UDBs. For example, a task that completely handles or performs a certain functionality, handles or performs the beginning or end of the functionality may be offloaded to the array of UDBs. For example, performing automatic gain control may free CPU time for other operations. In another example, front end filtering allows the CPU more contiguous processing time before the CPU takes the input value and processes the input value. In a further example, calculating a square root value may be a final calculation that may be provided straight to a serial interface after completion. By calculating the square root value using the array of UDBs, this may reduce the computational bandwidth used by the CPU.

The user may store different configuration data (e.g., Verilog macros, APIs, source code such as C source code files, etc.) that may include information that may be used to configure the UDBs to perform tasks that the user determines may be offloaded to the UDBs. A configuration module or component may use the configuration data to configure the UDBs in the SoC. A configuration module or component may be a software application or component (e.g., a compiler), a hardware component (e.g., a circuit that is coupled to the SoC or is part of the SoC), or a combination of both. In one embodiment, when an SoC performs functions or operations (e.g., when the SoC executes an application), the user may provide user input to indicate to the configuration module that one or more tasks should be offloaded to the UDBs. The user may also provide user input that indicates to the configuration module which configuration data should be used by to configure the UDBs to perform the one or more tasks. The configuration module may use the configuration data to configure the UDBs. In another embodiment, when an SoC performs functions or operations (e.g., when the SoC executes an application) the configuration module may detect that the SoC is about to perform one or more tasks that may be offloaded to the UDBs. The configuration module may prompt a user with the list of one or more tasks and may receive user input selecting a task (or multiple tasks). The configuration module may use the configuration data for the selected task (or multiple tasks) to configure the UDBs to perform the selected task (or multiple tasks). In a further embodiment, when an SoC performs functions or operations (e.g., when the SoC executes an application) the configuration module may detect that the SoC is about to perform one or more tasks that may be offloaded to the UDBs. The configuration module may automatically access configuration data for the one or more tasks and may configure the UDBs to perform the one or more tasks based on the configuration data.

At block 1910, the method 1900 receives data indicating which functions should be performed by each UDB in the array of UDBS. For example, the method 1900 may receive a list of op-codes and functions or actions that a datapath in a UDB may perform when an op-code is received. These functions may be the computational portion of an algorithm or task. Complicated portions of this algorithm or task may be broken down further into functions achievable in UDBs and the process (e.g., the sequences or order of functions) by which they are achieved. At block 1915, the method 1900 receives additional data indicating the sequence by which the task is completed. For example, the method 1900 may receive information that may be used to generate a state machine in the PLD of a UDB. The method 1900 may receive the data received in block 1910 and the additional data received in block 1915 at the same time in a combined data that includes both the data and the additional data. At block 1920, the method 1900 configures the datapaths in the UDBs based on the data. For example, the method 1900 may configure an ALU in a datapath of the UDB to perform certain functions when certain op-codes are received. At block 1925, the method 1900 configures PLDs in the UDBs based on the additional data. For example, the method 1900 may configure the PLD to function as a state machine that controls the sequence of operations performed by the datapath for a UDB. At block 1930, the method 1900 may couple multiple datapaths to each other. For example, the method 1900 may couple the output of a datapath to an input of a second datapath. At block 1935, the method 1900 may couple the outputs of datapaths to registers (e.g., memory registers) of other datapaths. For example, two datapaths may be connected in serial and the output value from a first datapath may be used by a second datapath when the second datapath performs calculations. After block 1935, the method 1900 ends.

Embodiments of the present invention include various operations described herein. These operations may be performed by hardware components, software, firmware, or a combination thereof. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "receiving," "configuring," "coupling," "controlling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The digital processing devices described herein may include one or more general-purpose processing devices such as a microprocessor or central processing unit, a controller, or the like. Alternatively, the digital processing device may include one or more special-purpose processing devices such as a digital signal processor (DSP), an application specific integrated circuit (ASIC), a field programmable gate array (FPGA), or the like. In an alternative embodiment, for example, the digital processing device may be a network processor having multiple processors including a core unit and multiple microengines. Additionally, the digital processing device may include any combination of general-purpose processing devices and special-purpose processing devices.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

Although the operations of the methods herein are shown and described in a particular order, the order of the operations of each method may be altered so that certain operations are omitted, so that certain operations are added, so that certain operations may be performed in an inverse order, or so that certain operations may be performed, at least in part, concurrently with other operations. In another embodiment, instructions or sub-operations of distinct operations may be in an intermittent and/or alternating manner.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. An apparatus comprising:
    an array of peripheral function engines, wherein each peripheral function engine comprises a plurality of programmable devices and datapaths and each programmable device is coupled to its corresponding datapath and chaining inputs and outputs (IOs), wherein each datapath comprises a programmable arithmetic logic unit, first in first out (FIFO) registers to serve as parallel data interfaces, and memory registers;
    a central processing unit coupled to the array of peripheral function engines via a bus;
    a configuration module, which has access to configuration data, to identify at least one task to offload from the central processing unit to the array of peripheral function engines,
    wherein the array of peripheral function engines is configured by the configuration module utilizing the configuration data to perform the at least one task, wherein the programmable devices are configured to control operation of its corresponding datapath including a sequence of operations;
    a memory coupled to the array of peripheral function engines and the central processing unit via the bus; and
    a plurality of input-output (IO) ports coupled to the array of peripheral function engines via a configurable digital interconnect, wherein the configurable digital interconnect is separate from the bus.

2. The apparatus of claim 1, wherein at least one peripheral function engine in the array of peripheral function engines is configurable to perform at least three functions from a group of functions comprising:
    an event counter;
    a timer;
    a pulse width modulator;
    a deadband pulse width modulator;
    a universal asynchronous receiver-transmitter;
    a baud rate generator;
    a square root calculator;
    an automatic gain controller function;
    an inter-integrated circuit interface; and
    a serial peripheral interface.

3. The apparatus of claim 1, wherein each programmable device includes a programmable logic device (PLD) coupled to a datapath.

4. The apparatus of claim 1, wherein the array of peripheral function engines is coupled to the memory via direct memory access.

5. The apparatus of claim 1, wherein the array of peripheral function engines is coupled to an interrupt controller.

6. The apparatus of claim 1, wherein a first peripheral function engine and a second peripheral function engine from the array of peripheral function engines are coupled together in series, wherein an output of the first peripheral function engine is coupled to an input of the second peripheral function engine.

7. The apparatus of claim 1, wherein a first peripheral function engine and a second peripheral function engine from the array of peripheral function engines are coupled to the central processing unit in parallel.

8. The apparatus of claim 1, wherein the array of peripheral function engines is coupled to at least one of an analog-digital-converter or a digital-analog converter.

9. The apparatus of claim 1, wherein the array of peripheral function engines is coupled to a fixed function peripheral.

10. A method comprising:
    identifying a task by a configuration module which has access to configuration data from a plurality of tasks to offload from a central processing unit to an array of peripheral function engines;
    receiving first data from the configuration module indicating functions of the task performed by at least one peripheral function engine in the array of peripheral function engines, wherein each peripheral function engine comprises a plurality of programmable logic devices (PLD) and datapaths and each programmable logic device is coupled to its corresponding datapath and chaining inputs and outputs (IOs), wherein each datapath comprises a programmable arithmetic logic unit, first in first out (FIFO) registers to serve as parallel data interfaces, and memory registers;
    receiving second data from the configuration module indicating a sequence for the functions performed by the at least one peripheral function engine,
    wherein the first data and the second data is based on the configuration data;
    configuring the datapaths based on the first data; and
    configuring the PLDs based on the second data, wherein the PLDs are configured to control operation of their corresponding datapaths including a sequence of operations.

11. The method of claim 10, wherein configuring the datapath comprises:
    configuring the at least one peripheral function engine to use a plurality of op-codes based on the first data, wherein each op-code in the plurality of op-codes causes the at least one peripheral function engine to perform an operation when the at least one peripheral function engine receives the op-code.

12. The method of claim 10, wherein configuring the programmable logic devices comprises:
    configuring a state machine within the at least one peripheral function engine based on the second data, wherein the state machine controls an operation of a datapath.

13. The method of claim 10, further comprising:
    coupling an output of a first datapath of a first peripheral function engine block to an register of a second datapath of a second peripheral function engine block via direct memory access.

14. The method of claim 10, further comprising:
    coupling an output of a first datapath of a first peripheral function engine block to an input of a second datapath of a second peripheral function engine block via a configurable digital interconnect.

15. The method of claim 10, wherein the at least one peripheral function engine in the array of peripheral function engines is configurable to perform at least three functions from a group of functions comprising:
    an event counter;
    a timer;
    a pulse width modulator;
    a deadband pulse width modulator;
    a universal asynchronous receiver-transmitter;
    a baud rate generator;
    a square root calculator;
    an automatic gain controller function;
    an inter-integrated circuit interface; and
    a serial peripheral interface.

16. The method of claim 10, further comprising coupling a first programmable logic device of a first peripheral function engine to a second programmable logic device of a second peripheral function engine.

17. The method of claim 12, wherein the state machine is part of the programmable logic device within the at least one peripheral function engine.

* * * * *